US012609937B2

(12) United States Patent     (10) Patent No.:   US 12,609,937 B2

Charlson                (45) Date of Patent:      Apr. 21, 2026

(54) SYSTEM, METHOD, AND APPARATUS FOR INITIATING OUTBOUND COMMUNICATIONS FROM A USER DEVICE

(71) Applicant: Scam Off Limited, Pittsburgh, PA (US)

(72) Inventor: Joseph A. Charlson, Pittsburgh, PA (US)

(73) Assignee: Scam Off Limited, Pittsburgh, PA (US)

( * ) Notice: Subject to any disclaimer, the term of this patent is extended or adjusted under 35 U.S.C. 154(b) by 0 days.

(21) Appl. No.: 19/196,987

(22) Filed: May 2, 2025

(65) Prior Publication Data

US 2025/0260697 A1     Aug. 14, 2025

Related U.S. Application Data

(63) Continuation of application No. 18/769,693, filed on Jul. 11, 2024, now Pat. No. 12,316,643.

(60) Provisional application No. 63/526,227, filed on Jul. 12, 2023.

(51) Int. Cl.
    *H04L 9/40*         (2022.01)

(52) U.S. Cl.
    CPC ........ *H04L 63/102* (2013.01); *H04L 63/0227* (2013.01); *H04L 63/101* (2013.01); *H04L 63/1408* (2013.01)

(58) Field of Classification Search
    CPC . H04L 63/102; H04L 63/0227; H04L 63/101; H04L 63/1408
    See application file for complete search history.

(56) References Cited

U.S. PATENT DOCUMENTS

| | | | | |
|---|---|---|---|---|
| 6,226,678 | B1 * | 5/2001 | Mattaway ........... | H04L 65/1096 |
| | | | | 709/227 |
| 8,468,580 | B1 * | 6/2013 | Casey ................... | G06F 21/606 |
| | | | | 726/4 |
| 8,554,912 | B1 * | 10/2013 | Reeves ................. | G06F 21/552 |
| | | | | 455/410 |
| 9,349,016 | B1 * | 5/2016 | Brisebois ................ | H04L 63/20 |
| 10,277,628 | B1 * | 4/2019 | Jakobsson ........... | H04L 63/1483 |
| 10,491,603 | B1 * | 11/2019 | Robinson ................ | H04L 63/20 |
| 10,601,986 | B1 * | 3/2020 | Botner ................ | H04M 3/2281 |
| 10,949,541 | B1 * | 3/2021 | Joshi .................... | H04L 63/1425 |
| 11,165,797 | B2 * | 11/2021 | Ackerman .......... | H04L 63/1458 |
| 11,463,574 | B1 * | 10/2022 | Smith-Rose .......... | H04M 1/663 |
| 11,575,791 | B1 * | 2/2023 | Arsanjani ............... | G10L 25/63 |

(Continued)

*Primary Examiner* — Jason Chiang

(74) *Attorney, Agent, or Firm* — The Webb Law Firm

(57)          ABSTRACT

Provided is a system including at least one processor configured to detect a communication request for a communication between a protected party and a second party, in response to determining the communication originated from the second party, determine if an identity of the second party is verified by the originating service provider based on at least one of STIR/SHAKEN attestation or a network operator, in response determining that the identity of the second party is verified by the originating service provider, initiate a search in a database maintained by the protected party based on an identifier of the second party, determine if the identifier of the second party matches an entry in the database based on the search, and in response to determining that the identifier of the second does not match an entry in the database, automatically monitor the communication in real-time.

30 Claims, 6 Drawing Sheets

(56)                    References Cited

U.S. PATENT DOCUMENTS

| | | | |
|---|---|---|---|
| 12,335,439 B1* | 6/2025 | Taylor | H04M 3/42059 |
| 2003/0108158 A1* | 6/2003 | Brown | H04M 3/42 379/88.01 |
| 2003/0108159 A1* | 6/2003 | Brown | H04M 15/06 379/88.01 |
| 2003/0152198 A1* | 8/2003 | Price | H04M 1/663 379/88.19 |
| 2011/0178933 A1* | 7/2011 | Bailey, Jr. | H04L 63/20 726/1 |
| 2012/0287823 A1* | 11/2012 | Lin | H04M 3/42042 370/259 |
| 2013/0102297 A1* | 4/2013 | Chavernac | H04L 65/1069 455/415 |
| 2016/0373576 A1* | 12/2016 | Sankaranarayanan | H04M 3/42093 |
| 2017/0085706 A1* | 3/2017 | Kim | H04W 4/16 |
| 2017/0150353 A1* | 5/2017 | Hillis | H04W 12/122 |
| 2017/0331828 A1* | 11/2017 | Caldera | H04L 63/0807 |
| 2018/0115560 A1* | 4/2018 | Green | H04L 63/126 |
| 2018/0278746 A1* | 9/2018 | Yacov | H04M 7/0012 |
| 2018/0343138 A1* | 11/2018 | Murakami | H04L 12/2805 |
| 2019/0065736 A1* | 2/2019 | Dharmadhikari | G06F 9/45533 |
| 2019/0379711 A1* | 12/2019 | Sood | H04W 12/12 |
| 2020/0053205 A1* | 2/2020 | Sial | H04M 3/42059 |
| 2020/0104852 A1* | 4/2020 | Douglas, Jr. | H04L 63/1408 |
| 2020/0285761 A1* | 9/2020 | Buck | G06F 21/51 |
| 2020/0287910 A1* | 9/2020 | Zerrad | H04L 63/102 |
| 2020/0304503 A1* | 9/2020 | Zerrad | H04L 63/10 |
| 2020/0304546 A1* | 9/2020 | Chavez | H04L 65/1076 |
| 2020/0366787 A1* | 11/2020 | Sharpe | H04M 15/56 |
| 2021/0250369 A1* | 8/2021 | Åvist | G06F 21/552 |
| 2021/0337067 A1* | 10/2021 | Moore | H04L 63/1483 |
| 2021/0390540 A1* | 12/2021 | Gupta | G06Q 20/206 |
| 2022/0114594 A1* | 4/2022 | Nunes | G06Q 20/4016 |
| 2022/0116415 A1* | 4/2022 | Burgis | H04L 67/51 |
| 2022/0245359 A1* | 8/2022 | Ho | G06F 18/2148 |
| 2022/0407893 A1* | 12/2022 | Maiman | H04W 12/71 |
| 2022/0417286 A1* | 12/2022 | Moon | H04L 63/02 |
| 2023/0120695 A1* | 4/2023 | Moore | H04L 63/105 726/1 |
| 2023/0252190 A1* | 8/2023 | Mossoba | G06F 21/6254 726/26 |
| 2023/0308460 A1* | 9/2023 | Thomas | H04L 63/102 |
| 2024/0022582 A1* | 1/2024 | Douglas | H04L 41/16 |
| 2024/0045889 A1* | 2/2024 | Prodanovic | G06Q 30/0609 |
| 2024/0121242 A1* | 4/2024 | Miyake | H04L 63/102 |
| 2024/0291827 A1* | 8/2024 | Wadia | H04L 63/102 |

* cited by examiner

300 — Receive a communication request

302 — Generate a query request

304 — Receive recipient data

306 — Approved based on recipient data?

yes → Automatically initiate communication — 310 no

308 — Prompt user

309 — Confirm or cancel?

confirm → cancel

312 — Cancel communication

400 — Receive a communication request

402 — Generate a query request

404 — Receive recipient data

406 — Approved based on recipient data?

yes → 410 — Automatically initiate communication no

408 — Prompt user

412 — Start timer

414 — Timer expires w/out input?

no yes

Call progression from Invitation to Bye
Simplified SIP example

SYSTEM, METHOD, AND APPARATUS FOR INITIATING OUTBOUND COMMUNICATIONS FROM A USER DEVICE

CROSS REFERENCE TO RELATED APPLICATION

This application is a continuation of U.S. patent application Ser. No. 18/769,693 filed on Jul. 11, 2024, and claims the benefit of U.S. Provisional Patent Application No. 63/526,227, filed on Jul. 12, 2023, the disclosures of which are hereby incorporated by reference in their entirety.

BACKGROUND

1. Field

This disclosure relates generally to communications via calls and text messages, and in non-limiting embodiments, to systems, methods, and apparatuses for initiating outbound communications from a user device, for receiving inbound communications to a user device, and for real-time processing of communications involving a user device.

2. Technical Considerations

When making a telephone call, sending a text message, or sending an email, it is implied that the caller/sender knows something about the entity with whom they are communicating. However, there is not an easy way to determine the legitimacy of the phone number, messaging short code, telephone number, or email address, and this is particularly difficult when responding to fraudulent emails, voice messages, pop-up ads, and malware where a sense of urgency is imparted to the caller/sender and the caller/sender believes they are communicating with an entity the caller/sender trusts. It is unreasonable for the average person to become a sleuth and ferret out the veracity of the telephone number or email address, particularly once a fraudster has created a sense of urgency in the mind of the caller/sender. Reverse phone number lookup services exist, but using one involves a person selecting such a service and typically purchasing some kind of report. However, with modern internet connected smart phones, softphones, and Voice-over-IP (VoIP) phones, there is an opportunity to validate the identity of the callee/intended recipient automatically as part of the communications process.

Today, the identity of the callee is typically presented firstly if it exists and as it exists in the caller's Contacts/Address Book, and if no such entry exists on certain smart phones, carrier networks may present a business or person's name that appears in a CNAM (Caller ID Name) database. This is the information that is presented to the recipient of a call. A key limitation of CNAM is that phone networks have allowed illegitimate caller ID spoofing where one party masquerades as another. STIR (Secure Telephony Identity Revisited)/SHAKEN (Signature-based Handling of Asserted information using Tokens) is an industry-standard caller ID authentication technology, comprised of a set of technical standards and protocols that allow for the authentication and verification of caller ID information for calls carried over Internet Protocol (IP) networks and is intended to combat caller ID spoofing on public telephone networks. It primarily is designed to prevent illegitimate caller ID spoofing and blocking of an unsolicited call for callers whose identity cannot be verified. None of these solutions addresses the issue of knowing the true ownership of a phone number for a person seeking to call a number they have received purporting to be a trusted business. For example, there is no straightforward method for a consumer to know whether the phone number they are told to call in a fraudulent email they received about their recent Amazon® order is really a number controlled by Amazon®. These telecommunications fraudsters publish phone numbers in malware pop-ups in browsers, in emails, and on voicemails purporting to be trusted entities such as the IRS, Microsoft®, Bank of America®, etc. The recipients of these phone numbers have no practicable means of verifying the identity of whom they may be calling.

In cases where the number is a part of the recipient's Contacts/Address Book, there is no mechanism of verifying the identity of the current responsible party/owner of the phone number. For example, if a person is texted an MMS message from a fraudster masquerading as an official representative of a business or government agency, e.g., the IRS, with a contact card attachment asking the recipient to Add to Contacts, whereby the integrity of the recipient's Contacts/Address Book is compromised, there exists no practicable mechanism to verify the true identity of the party responsible for the telephone number during inbound calls from, and when making outbound calls to, the telephone number because the Contacts/Address Book entry is given precedence by the telephone handset providers' operating system applications and no mechanism exists for pointing out discrepancies and presenting verified information about the authenticity of the identity ascribed to the telephone number.

An additional problem is the ability to track and maintain a history of companies you have requested to stop calling you, e.g., remove from their calling lists, place on their Do Not Call list, or responding STOP to cease text messages. These requests can often feel ineffective and do not support easy one-stop centralized management of opt-in/out by communications channel and communication preferences by channel, e.g., "please do not call me but you may text me," or "text me first and then when it makes sense I will agree to a call."

An additional problem that is not currently solved by the prior art is the preponderance of misdialed/wrong party calls where a caller either has the incorrect number of the intended callee due to an intentionally misleading telephone number being provided on a form, e.g., online inquiry form, or because the telephone number published in an advertisement, an email, or website is incorrect (a mistake) or because the caller simply miskeys the digits of a telephone number seen in a television ad, heard on the radio, displayed on a website, etc. These misdialed/wrong party calls are an interruptive nuisance to the called party and additionally waste the time of the caller.

An additional problem not solved by the prior art is that dialer/phone applications do not store the rich information provided by lookups potentially performed by the receiving carrier, by the handset operating system native dialer/phone, and by the third-party dialer/phone; they do not store the automated call screening history that is offered by some dialers, nor do they directly display the most recent text information exchanged with the specific calling phone number nor with the associated entity. They simply act as a finite log of calls received over time by a given number with access to the local Contacts record and a history of calls received and sent to a given number. To access the text message history, the user must launch the messaging application and reference it there. There is no way to link an outbound dialing history to a short code or alternate number the user has texted with from the same entity using phone number registration data unless the user has created a Contacts/Address Book entry containing both numbers. Further, there is typically no entry field for a company short code found in the Contacts/Address Book unless the user understands they can place a short code in a telephone field. Short codes are registered and company telephone numbers and 10-digit longcodes (10DLC/local numbers) must be registered to the entity's brand in order to text. With the STIR/SHAKEN protocol and similar proprietary frameworks such as Google® Verified Calls, enhanced caller ID data and rich call data (e.g., logo and reason for call) can be transmitted to a user's device during an inbound call and displayed in the dialer/phone, but there exists no mechanism for collating this attested data and combining it with other data, such as a registered telephone number and texting data, text history data, call screening application data, call response by text data, voicemails, and third-party scam/phishing/fraud data in one place in the dialer application for the user.

An additional problem not solved by the prior art is that audio and/or video communications do not provide automated real-time monitoring of communications to detect when someone is being scammed. There is no way to identify in process scam activity on a communication stream, inform the potential victim, the victim's trusted caregivers/family members, and authorities, and no mechanism to automatically terminate such communications when an in-process fraud is occurring. Further, there do not exist security connections between a person's audio/video communications on a device and contemporaneous access to downloading/activating screenshare or other software, accessing sensitive financial and health websites, portals, apps and applications, making purchases on websites with credit cards, gift cards, cash applications, ACH and other online payment applications and methods.

SUMMARY

According to non-limiting embodiments or aspects, provided is a system comprising: at least one processor programmed or configured to: detect a communication between a user device and a remote entity, the user device operated by a user; determine a security risk based on the communication; and in response to determining the security risk, automatically block at least one function within at least one application on at least one of the following: the user device, another user device associated with the user, or any combination thereof.

In non-limiting embodiments, the user device and/or another user device may include any computing device operated by a user, such as a desktop or laptop computer, a mobile device, a network-connected appliance, a wearable device, and/or the like. In non-limiting embodiments, the at least one application may be a mobile application, a website, a desktop application, and/or the like. In non-limiting embodiments, determining the security risk may include determining the existence of a security risk and/or determining that a predicted or measured risk satisfied a security risk threshold.

In non-limiting embodiments or aspects, the at least one application comprises at least one of the following: a two-factor authentication application, a biometric authentication application, an identity authentication application, a screen share application, a financial banking website or application, a credit card website or application, a peer-to-peer payment website or application, a messaging application, an email application, an e-wallet, a digital wallet, a cryptocurrency wallet, or any combination thereof. In non-limiting embodiments or aspects, the at least one application is on the another user device associated with the user, the at least one processor further programmed or configured to: determine a user profile associated with the user, wherein automatically blocking the at least one function is based on determining that the user profile is associated with the another user device.

In non-limiting embodiments, the user profile may include a user account, parameters associated with a user, and/or other like user information. In non-limiting embodiments, automatically blocking the at least one function is based on determining that the user profile is associated with the user on the another user device.

In non-limiting embodiments or aspects, wherein an identity of the remote entity to the communication is verified, the at least one processor further programmed or configured to: determine that the remote entity is affiliated with the at least one application; and in response to determining that the remote entity is affiliated with the at least one application, permit access to all functions in the at least one application.

In non-limiting embodiments, permitting access to all functions may involve suspending and/or disabling (e.g., deactivating) any blocking mechanisms associated with the user device, another user device, user profile, and/or the like. In non-limiting embodiments, affiliation with an application may be based on registration in a particular database and/or other like information.

In non-limiting embodiments or aspects, wherein determining the security risk based on the communication comprises: determining that the remote entity is a verified entity and is associated with a safe list; and in response to determining that the remote entity is a verified entity and associated with a safe list, suspending or deactivating the blocking of the at least one function within the at least one application.

In non-limiting embodiments, suspending or deactivating the blocking of the at least one function within the at least one application is based on disabling a blocking mechanism associated with a user profile of the user by storing or removing an indication (e.g., such as a flag or other parameter) in a database that represents a block.

In non-limiting embodiments or aspects, wherein determining the security risk comprises: determining, by monitoring the communication in real-time, that a security threshold has been satisfied.

In non-limiting embodiments, a security threshold is satisfied when a value of a security risk (e.g., a score or other metric) meets and/or exceeds a predetermined threshold value.

In non-limiting embodiments or aspects, wherein determining the security risk comprises: transcribing audio from the communication to text in real-time; and processing the text with at least one machine learning model to determine the security risk.

In non-limiting embodiments, the at least one machine-learning model may be local to the user device and/or another user device. In non-limiting embodiments, the at least one machine-learning model may be hosted by a remote server.

In non-limiting embodiments or aspects, wherein automatically blocking the at least one function within the at least one application comprises at least one of the following while the communication is ongoing: blocking text messages, blocking email messages, blocking telephone calls, blocking an identity authentication application, blocking an identity authentication message, blocking a biometric authentication function, blocking a biometric identity authentication function, blocking a username and password entry function, blocking a screen share function, blocking downloading of software or files, blocking a security verification message, blocking a password reset message, or any combination thereof.

In non-limiting embodiments, blocking a function may include disabling the application or function through an operating system of the user device and/or another user device, generating an API call to the application to cause the blocking, and/or the like.

In non-limiting embodiments or aspects, wherein determining the security risk comprises: determining, by the user device based on communicating with a server computer, if the remote entity is affiliated with at least one registered application and/or registered network location; and in response to determining that the remote entity is not affiliated with the at least one registered application and/or registered network location, determining the security risk. In non-limiting embodiments or aspects, wherein determining the security risk comprises: predicting, with at least one machine-learning model, a risk score based on the communication; comparing the risk score to a security threshold; and in response to determining that the risk score satisfies the security threshold, determining the security risk. In non-limiting embodiments or aspects, wherein automatically blocking the at least one function within the at least one application comprises: blocking the communication with a network address through the at least one application.

In non-limiting embodiments, blocking communication with a network address may include adding the network address to an application-level or operating system-level block list, sending the network address to a firewall application or system, and/or the like.

In non-limiting embodiments or aspects, wherein automatically blocking the at least one function within the at least one application comprises: blocking, with an operating system of the user device or the another user device, at least one of launching and accessing the at least one application. In non-limiting embodiments or aspects, the at least one processor is further programmed or configured to: generate, on the user device or the another user device, a notification based on at least one of determining the security risk and automatically blocking the at least one function, the notification is at least one of displayed on and audibly output from at least one of the user device and the another user device.

In non-limiting embodiments, the display of a blocking status and/or the output of an audible alert may occur on a dialer/phone application on the user device.

In non-limiting embodiments or aspects, wherein determining a security risk comprises: receiving an identification of at least one security parameter from a server remote from the user device, the security risk comprising at least one of the identification and a score based on the identification.

In non-limiting embodiments, the at least one security parameter may include a risk score, a binary indication of a particular risk, a risk category, and/or the like.

In non-limiting embodiments or aspects, the at least one application is on the another user device associated with the user, the at least one processor comprises a processor of a server computer remote from the user device, the user device comprises a telephone operated by the user, and the another user device comprises at least one of the following: a mobile device associated with the user, a computing device associated with the user, a network-connected appliance associated with the user, or any combination thereof.

In non-limiting embodiments, the telephone operated by the user may include a landline or the like, and the server computer may be part of the telephone switching network, provided by a third-party service, provided by a device manufacturer, and/or the like.

According to non-limiting embodiments or aspects, provided is a method comprising: detecting, with at least one processor, a communication between a user device and a remote entity, the user device operated by a user; determining, with at least one processor, a security risk based on the communication; and in response to determining the security risk, automatically blocking, with at least one processor, at least one function within at least one application on at least one of the following: the user device, another user device associated with the user, or any combination thereof.

In non-limiting embodiments or aspects, the at least one application comprises at least one of the following: a two-factor authentication application, a biometric authentication application, an identity authentication application, a screen share application, a financial banking website or application, a credit card website or application, a peer-to-peer payment website or application, a messaging application, an email application, an e-wallet, a digital wallet, a cryptocurrency wallet, or any combination thereof. In non-limiting embodiments or aspects, the at least one application is on the another user device associated with the user, further comprising: determining a user profile associated with the user, wherein automatically blocking the at least one function is based on determining that the user profile is associated with the another user device. In non-limiting embodiments or aspects, wherein an identity of the remote entity to the communication is verified, further comprising: determining that the remote entity is affiliated with the at least one application; and in response to determining that the remote entity is affiliated with the at least one application, permitting access to all functions in the at least one application.

In non-limiting embodiments or aspects, wherein determining the security risk based on the communication comprises: determining that the remote entity is a verified entity and is associated with a safe list; and in response to determining that the remote entity is a verified entity and associated with a safe list, suspending or deactivating the blocking of the at least one function within the at least one application. In non-limiting embodiments or aspects, wherein determining the security risk comprises: determining, by monitoring the communication in real-time, that a security threshold has been satisfied. In non-limiting embodiments or aspects, wherein determining the security risk comprises: transcribing audio from the communication to text in real-time; and processing the text with at least one machine learning model to determine the security risk. In non-limiting embodiments or aspects, wherein automatically blocking the at least one function within the at least one application comprises at least one of the following while the communication is ongoing: blocking text messages, blocking email messages, blocking telephone calls, blocking an identity authentication application, blocking an identity authentication message, blocking a biometric authentication function, blocking a biometric identity authentication function, blocking a username and password entry function, blocking a screen share function, blocking downloading of software or files, blocking a security verification message, blocking a password reset message, or any combination thereof.

In non-limiting embodiments or aspects, wherein determining the security risk comprises: determining, by the user device based on communicating with a server computer, if the remote entity is affiliated with at least one registered application and/or registered network location; and in response to determining that the remote entity is not affiliated with the at least one registered application and/or registered network location, determining the security risk. In non-limiting embodiments or aspects, wherein determining the security risk comprises: predicting, with at least one machine-learning model, a risk score based on the communication; comparing the risk score to a security threshold; and in response to determining that the risk score satisfies the security threshold, determining the security risk. In non-limiting embodiments or aspects, wherein automatically blocking the at least one function within the at least one application comprises: blocking the communication with a network address through the at least one application. In non-limiting embodiments or aspects, wherein automatically blocking the at least one function within the at least one application comprises: blocking, with an operating system of the user device or the another user device, at least one of launching and accessing the at least one application.

In non-limiting embodiments or aspects, wherein determining a security risk comprises: receiving an identification of at least one security parameter from a server remote from the user device, the security risk comprising at least one of the identification and a score based on the identification. In non-limiting embodiments or aspects, the at least one application is on the another user device associated with the user, the at least one processor comprises a processor of a server computer remote from the user device, the user device comprises a telephone operated by the user, and the another user device comprises at least one of the following: a mobile device associated with the user, a computing device associated with the user, a network-connected appliance associated with the user, or any combination thereof.

According to non-limiting embodiments or aspects, provided is a computer program product comprising at least one non-transitory computer-readable medium including program instructions that, when executed by at least one processor, cause the at least one processor to: detect a communication between a user device and a remote entity, the user device operated by a user; determine a security risk based on the communication; and in response to determining the security risk, automatically block at least one function within at least one application on at least one of the following: the user device, another user device associated with the user, or any combination thereof.

According to non-limiting embodiments or aspects, provided is a system comprising: at least one processor of a telecommunications device comprising a display and a communication application, the at least one processor programmed or configured to monitor, transcribe, and process the audio and/or video communications a protected party and at least one other entity, wherein the audio and/or video is being transcribed and/or processed to identify scam, phishing and/or predatory activity wherein said scam, phishing and/or predatory activity may include misrepresentation of who the entity really is, prompting/requesting to share private financial, health, physical and/or other personal information such as social security numbers, pins, passwords, addresses, photos, videos and the like, entreaties to meet, purchase gift cards and otherwise engage in suspicious unsolicited activity, the one or more activities representing a security risk to the protected party; and wherein said processor is programmed to perform at least one of the following activities: warn the protected party on their device display and/or audibly, suspend or otherwise block the communications, bridge in an advocate for the protected party and/or terminate the communication.

In non-limiting embodiments or aspects, the at least one processor is further programmed or configured to announce said monitoring and recording activity to one or both parties.

In non-limiting embodiments or aspects, where the system may be configured to perform one or more of the following actions: i) warn the protected party audibly and/or visually on the device display with button option to hang-up and/or button option to bring a security officer or caregiver into the conversation, ii) announce the situation to both parties, iii) mask compromising audio, iv) automatically bring a security officer or caregiver on the line, v) automatically terminate the call, vi) notify databases, telecommunications providers and interested entities of the potential scam activity and potentially share the recording and transcript with these databases and/or entities; and/or vii) communicate to the protected party what just happened and offer additional support.

According to non-limiting embodiments or aspects, the monitoring, transcription, processing and security call control actions may occur on the same device as the communications device via the device operating system, the dialer/phone application, or another application running on the communications device.

According to non-limiting embodiments or aspects, the transcription, monitoring and processing and security call control actions may be performed on and from at least one remote cloud processors via an audio and/or video communications stream of the communication media to said remote cloud processor.

According to non-limiting embodiments or aspects, the transcription, monitoring and processing may occur on a remote cloud processor via an audio and/or video communications stream of the communication media to the remote cloud processor.

According to non-limiting embodiments or aspects, the transcription, monitoring and processing may occur on a telecommunications network switch or other server infrastructure of the protected party's telecommunications carrier.

According to non-limiting embodiments or aspects, a computer program product comprising at least one non-transitory readable medium including program instructions that, when executed by at least one processor, cause the at least one processor to transcribe, process and monitor communications between another entity and a protected party; determine if the communications represents a security risk wherein security is comprised of one or more financial, reputational, emotional and/or physical risks to the protected party; and in response to determining the communication represents a security risk, take a programmed action including at least one of warning the protected party, suspending or blocking/masking the communication, bridging in a support operator for the protected party, and terminating the communication between the parties.

According to non-limiting embodiments or aspects, provided is a system comprising: at least one processor of a telecommunications device comprising a display and a communication application, the at least one processor programmed or configured to: receive, with the communication application, a communication request comprising a number, the communication request initiated by a user of the telecommunications device; determine whether to automatically initiate a communication to the number based on recipient data associated with the number; in response to determining to not automatically initiate the communication to the number, prompt the user, on the display of the telecommunications device, with a selectable option configured to initiate the communication to the number upon selection; and in response to determining to automatically initiate the communication to the number, automatically initiate the communication to the number upon selection.

In non-limiting embodiments or aspects, the at least one processor is further programmed or configured to retrieve the recipient data based on the number from at least one database. In non-limiting embodiments or aspects, wherein determining whether to automatically initiate the communication is based on a score derived from the recipient data. In non-limiting embodiments or aspects, the communication application comprises a dialer application, a messaging application, or any combination thereof. In non-limiting embodiments or aspects, the recipient data comprises at least one of the following: a verified identity of an entity associated with the number, crowd-sourced data, a callee number history, or any combination thereof. In non-limiting embodiments or aspects, the recipient data comprises image data, and the at least one processor is further programmed or configured to present the image data on the display of the telecommunications device prior to initiating the communication.

In non-limiting embodiments or aspects, the recipient data comprises a match result between the number and at least one of a contact list, a communication history, and a previously-approved list stored on the telecommunications device, and the at least one processer determines to automatically initiate the communication if the number matches with the contact list and/or communication history. In non-limiting embodiments or aspects, wherein determining whether to automatically initiate the communication to the number based on the recipient data associated with the number comprises: communicating a query comprising the number to a central database; and receiving, from the central database, a verification response based on the number, the recipient data comprising the verification response. In non-limiting embodiments or aspects, wherein determining whether to automatically initiate the communication to the number based on the recipient data associated with the number comprises: communicating a query comprising the number to at least one fraud database; and receiving, from the fraud database, fraud data based on the number, the recipient data comprising the fraud data. In non-limiting embodiments or aspects, the at least one processor is further programmed or configured to: obtain communication data from at least one prior communication initiated by an entity and received by the communications device, the communication data comprises at least a portion of the recipient data.

In non-limiting embodiments or aspects, the at least one processor is further configured to prompt a user before initiating the communication to select profile data to be shared with a recipient of the communication. In non-limiting embodiments or aspects, the at least one processor is further configured to: maintain a data repository of registered entities local on the telecommunications device, the recipient data comprises information from the data repository. In non-limiting embodiments or aspects, the at least one processor is further programmed or configured to: prior to determining whether to automatically initiate the communication to the number based on the recipient data associated with the number, communicating the communication request from the telecommunications device to a switching system; and receiving, from the switching system, the recipient data. In non-limiting embodiments or aspects, the at least one processor is further programmed or configured to: in response to user input on the telecommunications device, display at least a portion of the recipient data.

According to non-limiting embodiments or aspects, provided is a method comprising: receiving, with at least one processor, a communication request initiated by a user of a telecommunications device; determining, with the at least one processor, whether to automatically initiate a communication to a number based on recipient data associated with the number; and in response to determining to not automatically initiate the communication to the number, prompting the user, on a display of the telecommunications device, with a selectable option configured to initiate the communication to the number upon selection.

In non-limiting embodiments or aspects, the at least one processor is a switch processor located remote from the telecommunications device. In non-limiting embodiments or aspects, determining whether to automatically initiate the communication is based on a score generated derived from the recipient data. In non-limiting embodiments or aspects, the recipient data comprises a verified identity of an entity associated with the number. In non-limiting embodiments or aspects, the recipient data comprises image data, the method further comprising presenting the image data on the display of the telecommunications device prior to initiating the communication. In non-limiting embodiments or aspects, the method further comprises: before initiating the communication prompting a user on the telecommunications device to select profile data to be shared with a recipient of the communication.

According to non-limiting embodiments or aspects, provided is a computer program product comprising at least one non-transitory readable medium including program instructions that, when executed by at least one processor, cause the at least one processor to: receive a communication request initiated by a user of a telecommunications device; determine whether to automatically initiate a communication to a number based on recipient data associated with the number; and in response to determining to not automatically initiate the communication to the number, prompt the user, on a display of the telecommunications device, with a selectable option configured to initiate the communication to the number upon selection.

Further non-limiting embodiments or aspects are shown in the following clauses:

Clause 1: A system comprising: at least one processor programmed or configured to: detect a communication between a user device and a remote entity, the user device operated by a user; determine a security risk based on the communication; and in response to determining the security risk, automatically block at least one function within at least one application on at least one of the following: the user device, another user device associated with the user, or any combination thereof.

Clause 2: The system of clause 1, wherein the at least one application comprises at least one of the following: a two-factor authentication application, a biometric authentication application, an identity authentication application, a screen share application, a financial banking website or application, a credit card website or application, a peer-to-peer payment website or application, a messaging application, an email application, an e-wallet, a digital wallet, a cryptocurrency wallet, or any combination thereof.

Clause 3: The system of clause 1 or 2, wherein the at least one application is on the another user device associated with the user, the at least one processor further programmed or configured to: determine a user profile associated with the user, wherein automatically blocking the at least one function is based on determining that the user profile is associated with the another user device.

Clause 4: The system of any of clauses 1-3, wherein an identity of the remote entity to the communication is verified, the at least one processor further programmed or configured to: determine that the remote entity is affiliated with the at least one application; and in response to determining that the remote entity is affiliated with the at least one application, permit access to all functions in the at least one application.

Clause 5: The system of any of clauses 1-4, wherein determining the security risk based on the communication comprises: determining that the remote entity is a verified entity and is associated with a safe list; and in response to determining that the remote entity is a verified entity and associated with a safe list, suspending or deactivating the blocking of the at least one function within the at least one application.

Clause 6: The system of any of clauses 1-5, wherein determining the security risk comprises: determining, by monitoring the communication in real-time, that a security threshold has been satisfied.

Clause 7: The system of any of clauses 1-6, wherein determining the security risk comprises: transcribing audio from the communication to text in real-time; and processing the text with at least one machine learning model to determine the security risk.

Clause 8: The system of any of clauses 1-7, wherein automatically blocking the at least one function within the at least one application comprises at least one of the following while the communication is ongoing: blocking text messages, blocking email messages, blocking telephone calls, blocking an identity authentication application, blocking an identity authentication message, blocking a biometric authentication function, blocking a biometric identity authentication function, blocking a username and password entry function, blocking a screen share function, blocking downloading of software or files, blocking a security verification message, blocking a password reset message, or any combination thereof.

Clause 9: The system of any of clauses 1-8, wherein determining the security risk comprises: determining, by the user device based on communicating with a server computer, if the remote entity is affiliated with at least one registered application and/or registered network location; and in response to determining that the remote entity is not affiliated with the at least one registered application and/or registered network location, determining the security risk.

Clause 10: The system of any of clauses 1-9, wherein determining the security risk comprises: predicting, with at least one machine-learning model, a risk score based on the communication; comparing the risk score to a security threshold; and in response to determining that the risk score satisfies the security threshold, determining the security risk.

Clause 11: The system of any of clauses 1-10, wherein automatically blocking the at least one function within the at least one application comprises: blocking the communication with a network address through the at least one application.

Clause 12: The system of any of clauses 1-11, wherein automatically blocking the at least one function within the at least one application comprises: blocking, with an operating system of the user device or the another user device, at least one of launching and accessing the at least one application.

Clause 13: The system of any of clauses 1-12, wherein the at least one processor is further programmed or configured to: generate, on the user device or the another user device, a notification based on at least one of determining the security risk and automatically blocking the at least one function, wherein the notification is at least one of displayed on and audibly output from at least one of the user device and the another user device.

Clause 14: The system of any of clauses 1-13, wherein determining a security risk comprises: receiving an identification of at least one security parameter from a server remote from the user device, the security risk comprising at least one of the identification and a score based on the identification.

Clause 15: The system of any of clauses 1-14, wherein the at least one application is on the another user device associated with the user, wherein the at least one processor comprises a processor of a server computer remote from the user device, wherein the user device comprises a telephone operated by the user, and wherein the another user device comprises at least one of the following: a mobile device associated with the user, a computing device associated with the user, a network-connected appliance associated with the user, or any combination thereof.

Clause 16: A method comprising: detecting, with at least one processor, a communication between a user device and a remote entity, the user device operated by a user; determining, with at least one processor, a security risk based on the communication; and in response to determining the security risk, automatically blocking, with at least one processor, at least one function within at least one application on at least one of the following: the user device, another user device associated with the user, or any combination thereof.

Clause 17: The method of clause 16, wherein the at least one application comprises at least one of the following: a two-factor authentication application, a biometric authentication application, an identity authentication application, a screen share application, a financial banking website or application, a credit card website or application, a peer-to-peer payment website or application, a messaging application, an email application, an e-wallet, a digital wallet, a cryptocurrency wallet, or any combination thereof.

Clause 18: The method of clause 16 or 17, wherein the at least one application is on the another user device associated with the user, further comprising: determining a user profile associated with the user, wherein automatically blocking the at least one function is based on determining that the user profile is associated with the another user device.

Clause 19: The method of any of clauses 16-18, wherein an identity of the remote entity to the communication is verified, further comprising: determining that the remote entity is affiliated with the at least one application; and in response to determining that the remote entity is affiliated with the at least one application, permitting access to all functions in the at least one application.

Clause 20: The method of any of clauses 16-19, wherein determining the security risk based on the communication comprises: determining that the remote entity is a verified entity and is associated with a safe list; and in response to determining that the remote entity is a verified entity and associated with a safe list, suspending or deactivating the blocking of the at least one function within the at least one application.

Clause 21: The method of any of clauses 16-20, wherein determining the security risk comprises: determining, by monitoring the communication in real-time, that a security threshold has been satisfied.

Clause 22: The method of any of clauses 16-21, wherein determining the security risk comprises: transcribing audio from the communication to text in real-time; and processing the text with at least one machine learning model to determine the security risk.

Clause 23: The method of any of clauses 16-22, wherein automatically blocking the at least one function within the at least one application comprises at least one of the following while the communication is ongoing: blocking text messages, blocking email messages, blocking telephone calls, blocking an identity authentication application, blocking an identity authentication message, blocking a biometric authentication function, blocking a biometric identity authentication function, blocking a username and password entry function, blocking a screen share function, blocking downloading of software or files, blocking a security verification message, blocking a password reset message, or any combination thereof.

Clause 24: The method of any of clauses 16-23, wherein determining the security risk comprises: determining, by the user device based on communicating with a server computer, if the remote entity is affiliated with at least one registered application and/or registered network location; and in response to determining that the remote entity is not affiliated with the at least one registered application and/or registered network location, determining the security risk.

Clause 25: The method of any of clauses 16-24, wherein determining the security risk comprises: predicting, with at least one machine-learning model, a risk score based on the communication; comparing the risk score to a security threshold; and in response to determining that the risk score satisfies the security threshold, determining the security risk.

Clause 26: The method of any of clauses 16-25, wherein automatically blocking the at least one function within the at least one application comprises: blocking the communication with a network address through the at least one application.

Clause 27: The method of any of clauses 16-26, wherein automatically blocking the at least one function within the at least one application comprises: blocking, with an operating system of the user device or the another user device, at least one of launching and accessing the at least one application.

Clause 28: The method of any of clauses 16-27, wherein determining a security risk comprises: receiving an identification of at least one security parameter from a server remote from the user device, the security risk comprising at least one of the identification and a score based on the identification.

Clause 29: The method of any of clauses 16-28, wherein the at least one application is on the another user device associated with the user, wherein the at least one processor comprises a processor of a server computer remote from the user device, wherein the user device comprises a telephone operated by the user, and wherein the another user device comprises at least one of the following: a mobile device associated with the user, a computing device associated with the user, a network-connected appliance associated with the user, or any combination thereof.

Clause 30: A computer program product comprising at least one non-transitory computer-readable medium including program instructions that, when executed by at least one processor, cause the at least one processor to: detect a communication between a user device and a remote entity, the user device operated by a user; determine a security risk based on the communication; and in response to determining the security risk, automatically block at least one function within at least one application on at least one of the following: the user device, another user device associated with the user, or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION

Figure 1:
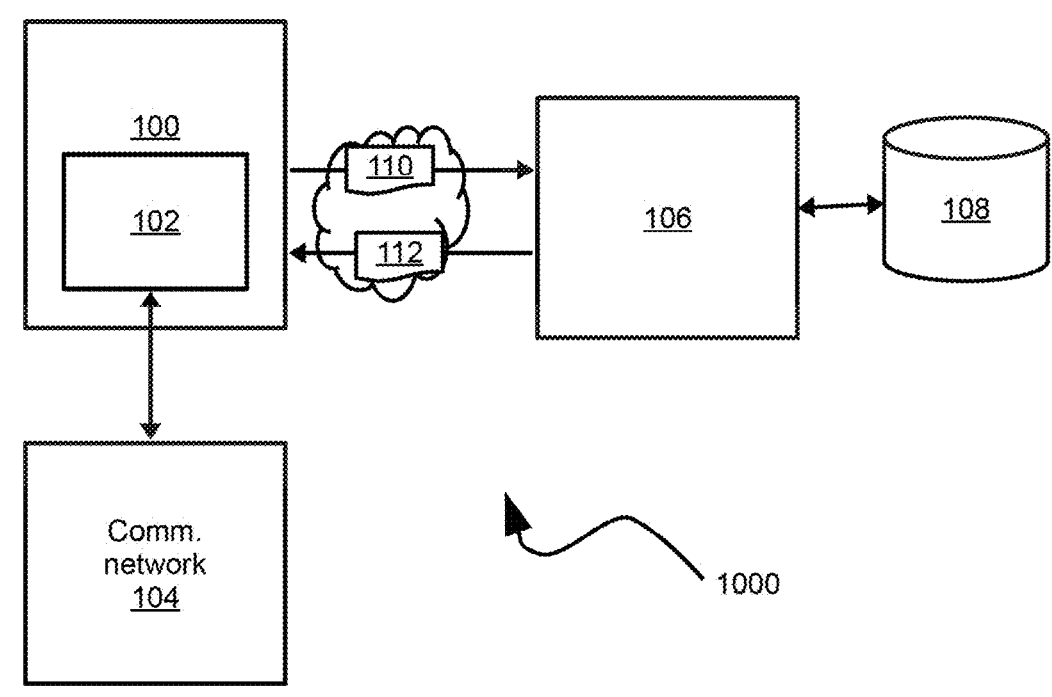
FIG. 1 is a diagram for a system for initiating outbound communications from a user device according to non-limiting embodiments or aspects.

For purposes of the description hereinafter, the terms "dialer" and "phone" applications should be viewed as one in the same as synonyms for the software a user utilizes to make and receive calls.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Referring to FIG. 1, shown is a system 1000 for initiating outbound communications from a user device according to non-limiting embodiments or aspects. A user device 100 may include a computing device such as a mobile phone (e.g., smartphone), tablet computer, personal computer, and/or the like. The user device 100 may include a communications application 102 installed thereon. The communications application 102 may include, for example, a dialer application, a text messaging application, and/or the like. In some examples, the communications application 102 may be a native dialer application or messaging application (e.g., such as an Android® or iOS application); however, it will be appreciated that various other communications applications may be used, such as Google® Voice, Phone by Google®, Messages by Google®, Zoom®, Meta™ Messenger, and/or the like.

The user device 100, via the communications application 102 and one or more communication devices (e.g., cellular or wireless network antennae), is in communication with a communications network 104. The communications network 104 may include a Public Switch Telephone Network (PSTN) and/or any other type of communications network. Through this communication, the communications application 102 may initiate outbound telephone calls, receive incoming telephone calls, initiate outbound messages (e.g., Short Message Service (SMS) messages or other types of text and/or multimedia messaging), receive incoming messages, and/or the like.

The user device 100 may be in communication with a remote server computer 106 via one or more public and/or private networks (e.g., such as the Internet). The remote server computer 106 may be in communication with a database 108 that it accesses upon request. For example, a request message 110 from the user device may be received through an Application Programming Interface (API) or other like mechanism. In response to the request message 110, the server computer 106 may query the database 108, generate a response message 112, and communicate the response message 112 to the user device 100. In some non-limiting embodiments, the user device 100 may query a database local to the user device. For example, if information from a previous query (e.g., to a central server and/or database 108) is stored locally, or if the user device originally has such information, the communication application may use the locally stored data. This may be, in some examples, based on how long the data has been stored locally (e.g., if it is up-to-date) based on a specified temporal threshold. In some examples, databases may be local and remote, such that multiple queries may be made. It will be appreciated that various arrangements of database(s) are possible.

In non-limiting embodiments, the user device 100 may initiate a communication in response to a user entering a phone number in a dialer application, selecting a name, phone number, or link on the user device 100, or sending a text message. For example, a user may choose to return a missed call, to call a phone number listed in a text message, or to respond to a text message. The user device 100 may determine whether to automatically initiate a communication to a number based on recipient data associated with the number. For example, the user device 100 may extract recipient data from the response message 112 and/or identify recipient data local to the user device 100. Recipient data may include a score (e.g., a fraud score or SPAM score), a call and/or text message history of the caller, a call and/or text message history of the callee (e.g., recipient of the communication), carrier analytics, crowd-sourced data (e.g., identity data, reputational data, and/or the like), and/or the like. In some non-limiting embodiments, the user device 100 may determine whether to automatically initiate a communication to the number based on comparing a score or other value from the recipient data or derived from the recipient data to a threshold and determining if the score satisfies (e.g., meets or exceeds) the threshold.

In non-limiting embodiments in which it is determined to not automatically initiate the communication, the user may be prompted, on the display of the user device 100 and/or audibly by the user device 100, to an option to initiate the communication. For example, a user may have to select a button, speak a command, make a gesture, and/or make another type of input in response to which the communication may commence. In some non-limiting embodiments, the prompt may provide the user with information about the number being communicated with. In non-limiting embodiments in which it is determined to automatically initiate the communication, the communication may commence without further input from the user. For example, a dialer application on the user device 100 may initiate an outbound call to the communications network 104 by sending a message to a switch.

In non-limiting embodiments, during an outbound communication, the user device 100 may display an option for the user to view at least a portion of the recipient data. For example, a single click, selection, or some other user input may cause the user device 100 to display recipient data on the device. This may include, for example, rating information, score information, and/or other like data. In such examples, the user of the user device 100 may be able to validate that the callee being communicated with matches the recipient data. Additional data may also be retrieved and displayed, such as registration data, reputational data, crowd-sourced data, and/or the like.

In some non-limiting embodiments, the user of the user device 100 may retrieve and/or request caller and/or sender data (e.g., caller data, data about an entity sending a message, etc.) during an inbound call in the same manner described above with respect to callee data (e.g., recipient data) during an outbound call. For example, a communication application on the user device 100 may present a selectable option during an inbound call and/or text message for the user to request caller and/or sender information from a local database and/or remote database (e.g., database 108). As a further example, a user that receives a text message may select an option on the message in an application and/or select the phone number to present caller and/or sender information on the display of the user device 100. In such examples, caller and/or sender information may be retrieved in one or more databases, including aggregating and collating information from multiple sources, with a simple user input (e.g., a single click or the like).

Figure 2:
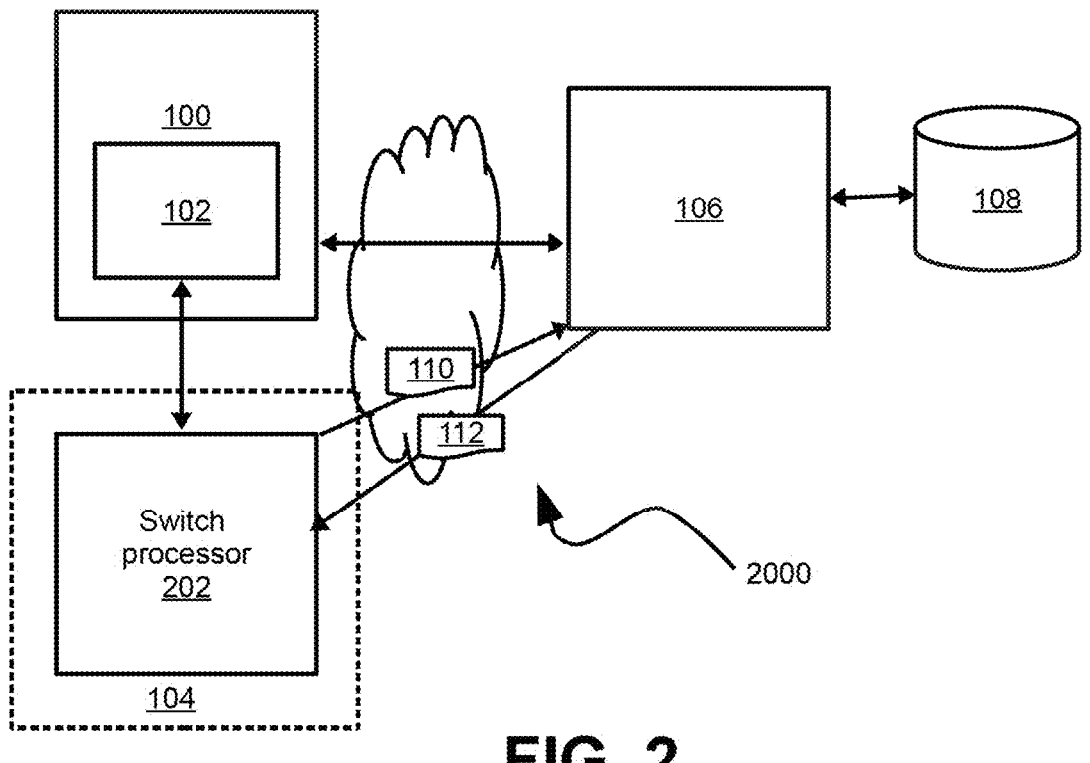
FIG. 2 is another diagram for a system for initiating outbound communications from a user device according to non-limiting embodiments or aspects.

Referring now to FIG. 2, shown is a system 2000 for initiating outbound communications from a user device according to non-limiting embodiments or aspects. The system 2000 in this example includes a switch processor 202 as part of the communications network 104. The switch processor 202 may be one or more computing devices associated with an intermediate switching system that receives an initial communication request from the user device 100 and determines whether to automatically initiate the communication request without further input from the user. In this non-limiting embodiment, the switch processor

202 may perform one or more of the steps discussed above being performed by the user device 100.

Still referring to FIG. 2, in non-limiting embodiments, in response to receiving an initial communication request from the user device 100 (e.g., a user attempting to make an outbound call or send an outbound text message), the switch processor 202 may send a request message 110 to a remote server computer 106. The request message 110 may include a phone number, name, alias, and/or the like such that the server computer 106 may identify recipient data and communicate it to the switch processor 202 via a response message 112. The switch processor 202 may extract recipient data from the response message 112, identify recipient data local to the switch processor 202, and/or receive recipient data from the user device 101. Recipient data may include a score (e.g., a fraud score or SPAM score), a call and/or text message history, and/or the like. In some non-limiting embodiments, the switch processor 202 may determine whether to automatically initiate a communication to the number based on comparing a score or other value from the recipient data or derived from the recipient data to a threshold and determining if the score satisfies (e.g., meets or exceeds) the threshold.

The determination of whether to automatically initiate a communication may be based on recipient data, which includes elements of the recipient data itself and/or data derived from (e.g., calculated or determined based on) the recipient data. For example, the recipient data may include a verified identity of an entity, such as a verification indicator (e.g., a binary flag of verified/not-verified), a verification score, a digital signature, and/or the like. In some non-limiting embodiments, the recipient data may include a match result (e.g., a binary flag of whether a match occurred and/or a matching score) between the number and a contact list, communication history (e.g., call or text message history), and/or a previously-approved list of approved (or non-approved) numbers. The recipient data may be local to the device and/or be obtained from a remote system (e.g., such as a switch processor, carrier service, web server, and/or the like). In such examples, determining to automatically initiate a communication may be based on determining that the number being called or messaged matches (e.g., is a match or has a match score that satisfies a threshold). In some non-limiting embodiments, determining to automatically initiate a communication may be based on communication history that includes communication data from at least one prior communication initiated by an entity, such as the content of text messages, the content of voicemails, missed call records, answered call or message records, outbound call and text messages, and/or the like.

In some non-limiting embodiments, the recipient data may include image data. For example, the image data may include a logo, verification icon, warning icon, and/or the like. In such embodiments, the user device 100 may display the image data prior to initiating the communication. For example, the image data may be displayed with a prompt for further user input before initiating the communication. The image data may also be displayed in examples where the communication is automatically initiated. In some examples, the image data may include a verification icon that represents a verified number or a warning icon that represents an unverified number or potential fraud, SPAM, or the like.

In non-limiting embodiments, the database 108 may include fraud data and the request message 110 may be a query to obtain a fraud score and/or some aspect of the fraud data. The fraud data may include, for example, a score representing a likelihood of the number being fraudulent, a binary indication of fraud or no-fraud, and/or the like.

In some non-limiting embodiments, the user device 100 and/or switch processor 202 may maintain a data repository of registered entities. The registered entities may be periodically updated automatically or upon request.

In some non-limiting embodiments, recipient data may be displayed to a user regardless of an approval the first time that a communication is attempted to that recipient. For example, a user may be prompted before a call or text message is completed the first time that the number is communicated with, based on a call or text message history, regardless of a score or content of the recipient data.

Figure 3:
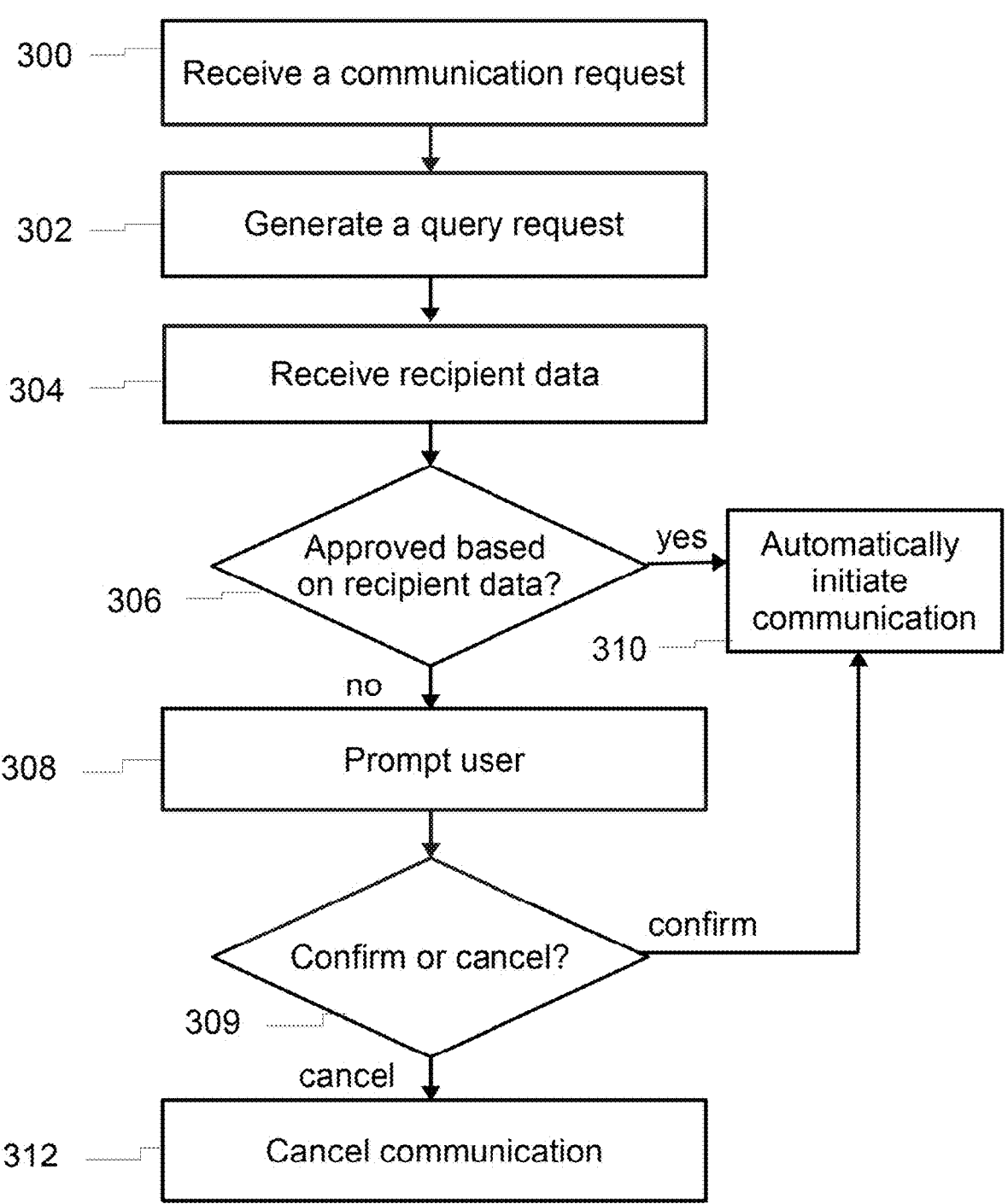
FIG. 3 is a flow diagram for a method for initiating outbound communications from a user device according to non-limiting embodiments or aspects.

Referring now to FIG. 3, shown is a flow diagram for a method of initiating outbound communications according to non-limiting embodiments. The steps shown in FIG. 3 are for example purposes only. It will be appreciated that additional, fewer, and/or a different order of steps may be implemented in non-limiting embodiments. At step 300, a communication request is received. This may include, for example, a dialer application or messaging application on a user device detecting a user request for a call (e.g., entering a number and pressing a call button, sending a text message, and/or the like). In some non-limiting embodiments, a switch processor remote from the user device (e.g., such as a server maintained by a service provider) may receive a communication request from the user device.

At step 302 of FIG. 3, a query request is generated. The query request may be generated by the user device in response to the communication request or may be generated by a switch processor in response to receiving a communication request from the user device. The query request may include a telephone number, name, network address, and/or other information associated with the communication request (e.g., an entity that the user of the user device is attempting to communicate with). The query request may be an API request in some examples. The query request may also be an HTTP query or may use any other communication protocol. The query request may be communicated to a server computer, such as a third-party service provider, a verification entity, a central authority, and/or the like. In some examples, the server computer and/or database being queried may be maintained by an industry association, e.g., such as a Cellular Telecommunications Industry Association (CTIA) registered entity database or the like, to look up and present true number ownership information prior to calling or texting a number.

At step 304, recipient data may be received by the user device and/or switch processor. In some examples, the recipient data may be received in response to the query generated at step 302. In some examples, the recipient data may be retrieved from resources local to the user device or switch processor. In some examples, the recipient data may include a combination of data received from a server computer and data retrieved from local resources.

At step 306, the user device or the switch processor determines whether to approve the communication request based on the recipient data (e.g., whether to automatically initiate the communication without prompting the user). For example, the user device or the switch processor may compare a score from the recipient data (e.g., a fraud score, a verification score, and/or the like) to a threshold and, if the score satisfies the threshold, determine to approve the communication request. The threshold may be predetermined and/or may be configurable by a user (e.g., based on a tolerance).

If the communication request is approved at step 306, the method may proceed to step 310 and the communication may be automatically initiated without prompting the user. For example, a telephone call may be completed such that it connects to a switch that rings the recipient phone, a text message may be transmitted to the recipient, and/or the like. In some examples, image data may be displayed on the user device indicating that the communication request is approved and/or the number is verified.

If the communication request is not approved at step 306, the method proceeds to step 308 and the user is prompted on the user device to provide an input. The prompt may be visual and/or audible. The prompt may provide information about the communication request, such as a score, indication of possible fraud, warning icon, and/or the like. In response to user input (e.g., selection of a button, a gesture, a spoken command, etc.), the user confirms the communication request or cancels the communication request at step 309. For example, a user may be provided with a single option to proceed, a single option to cancel, multiple options to proceed or cancel, and/or the like. If the user confirms at step 309, the method may proceed to step 310 and the communication may be initiated. If the user cancels and/or does not confirm at step 309, the method may proceed to step 312 and the communication request may be cancelled. If the communication request is cancelled, the number and/or entity may be stored in a database local and/or remote to the communication device to be used as recipient data in future interactions.

Figure 4:
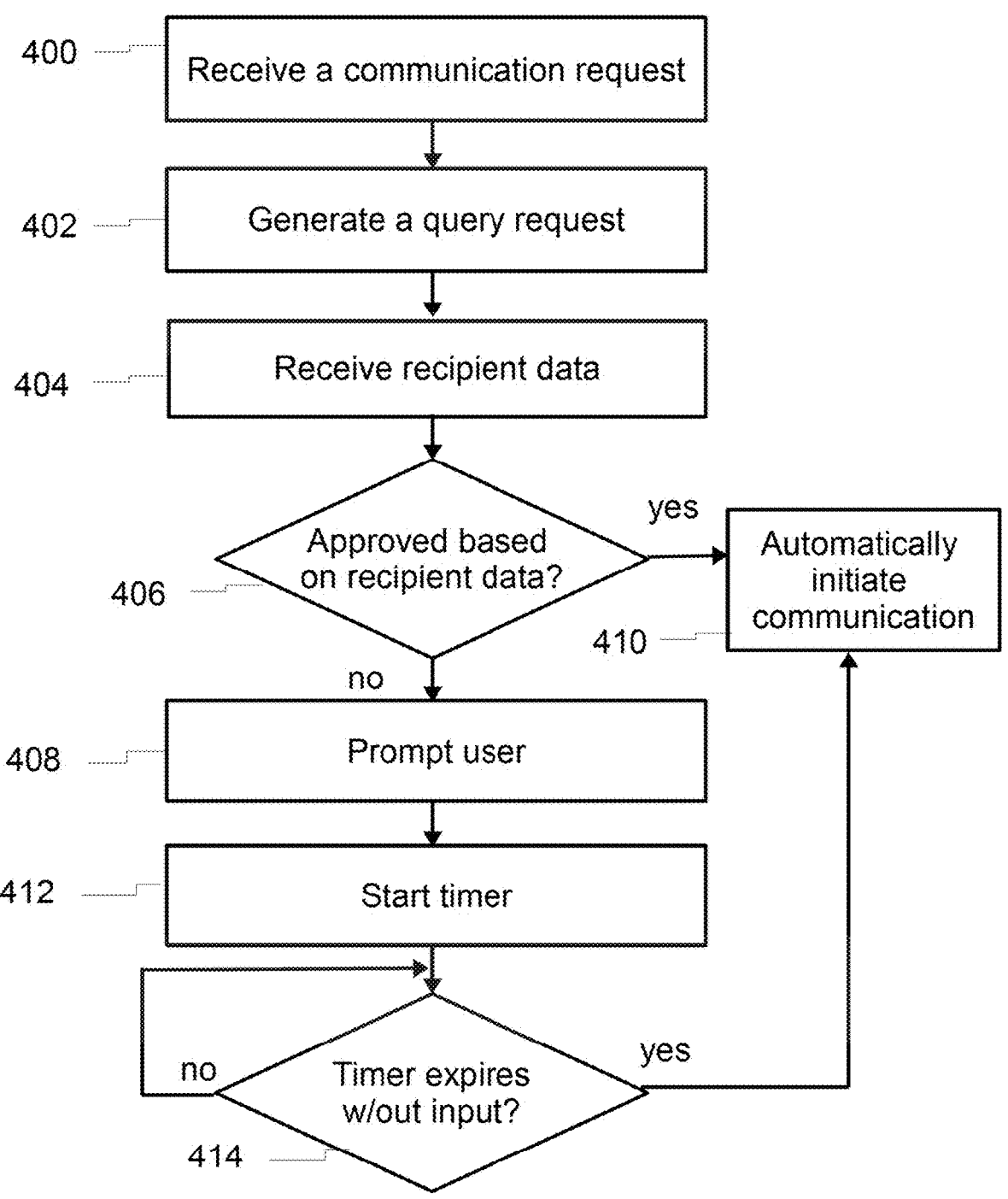
FIG. 4 is another flow diagram for a method for initiating outbound communications from a user device according to non-limiting embodiments or aspects.

Referring now to FIG. 4, shown is a flow diagram for a method of initiating outbound communications according to non-limiting embodiments. It will be appreciated that additional, fewer, and/or a different order of steps may be implemented in non-limiting embodiments. Steps 400, 402, 404, 406, 408, and 410 may be as described above in FIG. 3 for steps 300, 302, 304, 306, 308, and 310, respectively. At step 412, after the user is prompted at step 408, a programmatic timer may be started. The programmatic timer may be configured with a time period that is predetermined and/or set by the user. If the timer expires at step 414 and the user does not provide input during the time period (e.g., by affirmatively cancelling the communication request), the method may proceed to step 410 and the communication may be automatically initiated. Accordingly, the user may be provided with a delay during which the communication request can be cancelled such that the user can read any recipient data and/or warnings and decide whether to proceed. It will be appreciated that, in other non-limiting embodiments, the timer may be used to automatically cancel the communication request instead of initiate it such that step 410 is performed if the user affirmatively requests to proceed with the communication request within the time period and, otherwise, the communication request is cancelled.

In some non-limiting embodiments, a dialer application may include an entry box to search externally (e.g., on the Internet and/or a private database) based on registered organizations (e.g., such as a name of a company or individual) and receive, in return, registered information results that can be selected and called and/or texted. For example, if a user is uncertain that a call or text message came from Company X, the user may type "Company X" while the dialer or text message displays the number that the call or message came from. In some non-limiting embodiments, such registered information may be used to request a call or text message from the entity rather than make an outbound call or message.

In some non-limiting embodiments, the user device and/or communications application thereon may use the retrieved recipient information (e.g., such as registered entity information) to manage communication preferences and permissions with the registered entity across any and all multi-channel communications campaigns from the registered entity.

In some non-limiting embodiments, the communication application may automatically create an entry in a Registered Contacts/Registered Entity address book separate from but accessed alongside the user's personal contacts, and the automated Registered Contacts may be synchronized when accessed with updates from a centralized registered contacts database. In such examples, the user may select from one or more response modalities including but not limited to directly communicating information with pre-configured response types configured for the registered entity, such as opt-out/opt-in information, file a complaint, and/or the like.

In some non-limiting embodiments, the communication application may use the retrieved information and/or the attested entity information from a STIR/SHAKEN protocol and/or from a related caller ID authentication framework performed on an inbound communication to the user device to store rich call information in a local call history database and/or another local database on the user device. In such examples, tools may be provided to the user to manage communications preferences, permissions, and complaints with the entity, the user's carrier, the handset operator, the dialer application, and/or the connectivity partner or outbound calling telephony provider.

In non-limiting embodiments, a handset plus telephone number for carrier level attestation on outbound calls from a person to an entity may be used to provide authentication of the person to the entity and to streamline the handling of the call. In non-limiting embodiments, a handset plus telephone number for connectivity partner level attestation on outbound text messages from a person to an entity may be used to provide authentication of the person to the entity and to streamline the handling of the text message. In non-limiting embodiments, a handset plus telephone number for carrier level attestation on outbound calls from a person to a person may be used to provide authentication of the person to the called or messaged person and to share identity and selected user profile information with the called/messaged person.

In non-limiting embodiments, the dialer or messaging application may be used to access the user's detailed contact and/or profile information with name, photo, image, URLs, other contact means, social media handles, address, and/or the like, and query the user on the user device (e.g., via a prompt on the display or audibly) before initiating the communication (e.g., making the call or sending the text message) to select whether to include no information, verified caller ID name information, additional user profile information, and/or a combination thereof, with the outbound communication (e.g., as metadata, embedded data, and/or the like).

In non-limiting embodiments, the dialer or messaging application may be used to present the registered entity information and/or associated rich data to the user but then delay the actual initiation of the call or the sending of the message, thereby providing an opportunity for the user to review the retrieved information during the delay with an option to cancel the outgoing communication if necessary. Upon expiration of the delay without the user cancelling the outbound communication, the communication application and/or switch processor may then proceed with initiating the call or sending the message without further input from the user.

In non-limiting embodiments, provided is a system including at least one processor of a telecommunications device (e.g., a mobile device, a landline telephone, and/or the like) having a display and a communication application (e.g., a messaging application, a dialer application, and/or the like), the at least one processor programmed or configured to: receive, with the communication application, a communication request comprising a number (e.g., a telephone number, an SMS short code, and/or the like), the communication request initiated by a user of the telecommunications device; determine whether to automatically initiate a communication to the number based on recipient data associated with the number; in response to determining to not automatically initiate the communication to the number, prompt the user, on the display of the telecommunications device, with a selectable option configured to initiate the communication to the number upon selection; and in response to determining to automatically initiate the communication to the number, automatically initiate the communication to the number upon selection. A method and computer program product are also described herein.

In non-limiting embodiments, a system, method, and computer program product are provided for utilizing a certified identity and reputation lookup system to apprise the caller/sender of the party responsible for the phone number or other messaging communications moniker, such as short code or registered text messaging chatbot. Non-limiting embodiments provide an API for communications applications (e.g., dialer applications, messaging applications, web sites, and/or the like) executed by user devices (e.g., mobile phones, smartphones, landline phones, IP phones, and/or the like) to retrieve authenticated ownership information and related meta data for communications monikers, e.g., telephone numbers, short codes, registered text messaging chatbots, and/or the like. Non-limiting embodiments assist users with communicating with their intended entities and help to prevent communication with fraudsters and misdirected communications, e.g., misdials. There are many means of entering a number into a dialer application, such as direct typing, speech to text, HTML Tel tag, or other phone number identification by the computer or phone operating system, messaging application, or browser application. Once a number is entered, the dialer (or other communication application) can proceed to perform lookups of the associated identity from at least one external database of vetted organization information in combination with the user's call history and Contacts/Address Book. The dialer will display the registered owner of the number if one exists and query/prompt (e.g., audibly and/or visually) the user if they want to proceed with calling this organization based on the retrieved information. If no registered entity can be identified, the dialer may present registered entities with similar numbers to assist the user in correcting a mistyped/wrong number. The communication application will perform this lookup and for at least non-registered numbers, query the user at least one time before the user has ever completed a call/text to the specified entity or has completed a call/text in the extent of the user's telephone history. In a non-limiting embodiment, a higher security mode is made available in which the communication application will confirm that the user intends to make a call on each call attempt to the specified entity or to all numbers lacking registered entity information. By apprising people of the registered identity of the phone numbers and other communication monikers and providing direct access to reputation information in the communication applications for dialing and messaging, and by acting as a gate in the communications flow from online media to these applications, the user is better able to control with whom they are sharing sensitive information and can avoid misdirected and misdialed calls/texts. By including an option to review third-party entity reputation information and related industry membership and credentials of an entity from within the dialer or messaging application, the user can become better informed about the entity, be alerted to potential warnings or issues, and make better decisions about with whom they choose to communicate. By including information on whether the number selected or if there is a related entity number that is capable of receiving, processing, and responding to text messages, the communication application (such as a dialer) can provide a means for the user to directly initiate contact via text message with the entity.

A user can also type or input user speech-to-text to enter names in the communication application text entry box to perform a search by name. In this case, the communication application will return matches from the user's Contacts/Address Book and in non-limiting embodiments will also search for registered entities matching the search string. When an entity is searched, if a department is not specified, the communication application will prioritize an entity's number listed as Main and Customer Service in the registered entity telephone number entries.

For example, the text entry box in one of or both the dialer and messaging applications may return matches from the user's Contacts/Address Book and will search externally for registered entities matching a number or registered entities matching a name the user enters. In the received registered data, the dialer and messaging applications can inform the user of numbers that are registered to receive calls and those that are registered or to receive and respond to text messages.

For inbound calls, when the authenticity of an inbound call can be affirmed by STIR/SHAKEN attestation or other vetted information identity source, the identity information may be stored in the Call History (or another database local to the user device) along with the logo, call reason, and attestation level. Remote databases may also be used. For inbound messages, when the registered identity can be affirmed by a certified lookup, this information may appear and be stored in the message thread.

In a non-limiting embodiment, the user is presented with the retrieved data prior to initiating the actual outbound dial or sending of the message to the connectivity for a review period, and the outbound communication then proceeds/effectuates after the delay unless the user intervenes to cancel the communication prior to the expiration of the review delay.

This service may occur prior to initiating the call/connection or prior to sending the message/email so that the caller/sender is informed of the verified identity or lack thereof for the phone number/email address. Non-limiting embodiments may additionally provide alerts based on reports of scam activity related to the number. The user when presented with this information can make an informed decision as to whether to continue with the outbound communication or whether to abort it and optionally report it. Once a number is added to the user's Contacts/Address Book, the pre-communication lookup service may optionally be suspended on this number for businesses until the phone number changes ownership, or for some prescribed duration, or until the contact is removed from the user's Contacts/Address Book. For traditional landline phones that lack the internet connection, for situations with organization/entity level telecommunications switches, and/or for situations where the lookup is delayed, some non-limiting embodiments may present the information through a redirect of the call to a processing stage where the verifiable information is verbally/audibly communicated and/or on-screen communication of the callee's (e.g., recipient's) identity to the caller either prior to connecting the caller with the dialed number or without a pre-call redirect wherein this information could be verbally/audibly and visually communicated to the caller while the call is in progress. Additionally, such pre-call gating may require the user to complete a keypress or voice response in order to continue the call in some non-limiting embodiments.

The retrieved collated information will be maintained in the user's stored Call History and Messaging conversation thread. The user can choose to add the registered information to their Contacts/Address Book application particularly if they wish to add notes or make a Nickname but the retrieved information is, in non-limiting embodiments, maintained directly in the dialer call history and/or messaging application message thread without requiring direct user action.

This rich information creates an ad hoc set of historical communications information for calls to and from organizations, with the logo, name, and reason for the call in the call history along with links to explore additional information about the entities. For unregistered numbers, non-limiting embodiments may display an icon conveying that the information is unknown, e.g., a question mark.

In a non-limiting embodiment, this rich history data may include most recent text exchanges, call-to-text responses, and additional response options for the user, e.g., request a call now, schedule future callback time, remove me from your call list, change my communications preferences with this entity, etc.

Non-limiting embodiments may utilize an information lookup service to advise the caller/sender (e.g., user) of the registered party's identity that controls the telephone number/short code/registered text messaging chatbot, who or what the caller/sender is intending to dial or has dialed, or is attempting to send a text message to. This information may be used to quickly apprise the caller of potential risks of making the call or sending the message. Risks may include initiating communications with a party that has misrepresented their identity in emails, web ads, computer malware/virus infections, voicemails, and/or text messages, and parties that are engaging in phishing schemes or other fraudulent activities. Other risk information may include presenting the business reputation scores, e.g., the Better Business Bureau and other ratings and reviews of the service provider the user is contacting. This system may additionally be configured to interrupt an on-going call with an auditory warning alert and/or displayed screen information alerting the caller about potential reports of fraudulent scam activity taking place on the number they are connected with or have previously connected with. This reported security threat, e.g. fraudulent scam activity, may be determined by real-time (e.g., while the call is ongoing) active monitoring, transcription, software, and artificial intelligence model processing of the ongoing call content and from previous calls with this number and/or entity. Such pre-call or during-call information may help prevent consummation of telephone calls to numbers that are part of phishing schemes. For ongoing calls, regardless of which party initiated the call, a call interrupt service may cause termination of calls in some non-limiting embodiments. The interrupt may be made by the dialer application within the call audio media (e.g., the main audio of the communication), outside of the call audio media, or by the carrier within or outside the call audio media. The termination may be effected by the dialer application, the phone operating system, and/or by the carrier. Such a dialer alerting system information may also be used to advise the caller of positive and adverse third-party ratings of the entities they are calling.

Non-limiting embodiments may be used to provide relevant information about the intended message receiver of an SMS, MMS, and/or RCS message to inform the sender of the verified identity of the recipient and to apprise the sender of potential risks associated with initiating or continuing communications with this recipient. For example, as reputation information is developed over time, such as a downgrade in the recipient's business reputation or an increase in purported scam activity related to a telephone number, the sender can be apprised that they may want to reconsider the safety of continuing communications with this recipient.

In non-limiting embodiments, pre-call lookup information also serves to reduce the occurrence of misdials and wrong-party calls which are a waste of time and resources for both the caller and the callee (recipient). In the messaging application, this pre-message lookup also serves to reduce the occurrence of wrong-party messages.

Non-limiting embodiments may be configured to utilize the dialer and/or messaging applications to provide communication preferences to the registered entity including opting in and out of all communications or communications via a specific channel, e.g., voice or text, expressing preferred channels, and indicating occurrences when the user believes they have received calls or texts without having provided permission to do so. This information may be transmitted by the dialer or messaging application back to the registered entity via a complaint channel as specified in the registry, to the entity that signed the outbound call or the messaging connectivity partner that technically sent the offending outbound text message, and to the user's cellular voice and messaging carrier. This information may be made available to plaintiffs' attorneys to assist in the protection of consumers rights granted under the Telecommunications Protection Act (TCPA). By offering a manage communications option with the registered entity, a user may manage whether they want to receive communications from an entity, revoke previously granted communications permissions, and/or have a history of stated permissions and preferences, e.g., text me but do not call me unless I ask, or opt out of all communications from an entity.

Non-limiting embodiments may provide a means in the dialer application and/or messaging application to request a call from the registered entity and to include in that request a call reason. This "request a call" feature may be accessed by clicking on an action button from an entry in the user's Call History or from the registered entity's name in the Message History, by clicking on a button from the in-progress call screen in the dialer application, by clicking on a button immediately upon hanging up/ending a call to the entity in the dialer application, by clicking a button in a Rich Communication Service (RCS) message, and/or by clicking a button to text the request in a text message to the dialed number or to a registered text phone number, short code, or text messaging chatbot of the registered entity. The express written consent for this call request may be implicit in such a request but may be further validated in a resultant message to the user that confirms the user is agreeing to be called on the number (which may be a mobile number) and the user agrees the call may occur by automated means with a prerecorded message in compliance with the Telecommunications Protection Act regulations mandates or other laws/regulations for capturing express written consent. This request for a call may then be transmitted to the registered entity and entered into the registered entity's outbound call queue to service the outbound call requests. The transmission to the registered entity may occur via a pre-configured API, webhook, and/or web service configured to receive the call requests. For entities without an API/webhook/web service, the dialer application may trigger an autonomous call into the registered entity's configured call queue that waits in the call queue on behalf of the user, repeatedly asking the registered entity's agent to press a key or say an audible cue such as "call now" to initiate the call to the user. When the agent confirms, the outbound call is connected to the user's telephone number.

Non-limiting embodiments may provide authenticated user information to the entity the user is requesting the call from, e.g., this call request for this number was made from this user on their registered device and associated with this phone number. The user may choose to share name information or not in the request and further to provide a record of the requested TCPA authorization for this call.

Non-limiting embodiments may provide authentication information along with outbound calls to a registered entity that indicates whether the call is originating from a device associated with the specified telephone number attested by the carrier handling the outbound call from the user. This non-limiting embodiment pertains to a user initiating a call to an entity and either automatically transmitting or the user choosing (e.g., via a selectable option or other input) to transmit authentication information to the dialed entity. The association of the telephone number and device may be made by each of the dialer application, the operating system of the user device, and the carrier. The entity may or may not be in the user's Contacts/Address Book. In some non-limiting embodiments, the dialer application prompts the user to determine if the user wants to provide their authenticated caller ID information to the registered entity prior to initiating the call. The user can choose to include such information and the called registered entity may then use the received attestation to properly route and retrieve customer specific information automatically. In some non-limiting embodiments, this attestation information may be sent by the carrier or by the dialer application once a call has already been connected when prompted by the called entity. This authentication may be performed automatically or may be triggered by the user pressing a button on the communication application to effectuate the transmission of the authentication to the recipient entity. The recipient entity can then use this authentication of the person's identity to streamline the handling of the communication.

In some non-limiting embodiments, a user can include their properly formatted name, a photo or image, other contact usernames, e.g., social media monikers, links to profiles, and URLs, in outbound calls made from a device that is associated to their telephone number by their carrier or in combination of the dialer application with the operating system of the device and the user's carrier.

According to another non-limiting embodiment, provided is a computer program embedded in the native smartphone operating system dialer application, handset manufacturer's customized version of the operating system dialer, or third-party dialer application, e.g., Skype®, Doximity®, Signal, Teams, Zoom®, etc., wherein the act of clicking on the call button first does a lookup of the phone number's ownership from the most certifiable source of phone number ownership available, e.g., a CTIA sanctioned database, and if not found, proceeds down a ranked path of database lookups to determine ownership or control of the current phone number entered into the dialer and then presents the summary information about the entity that controls the number in a succinct manner, e.g., entity name and logo information when certified ownership/control can be authenticated. Once the entity information is presented, the caller can click a Continue button/con/link or input a voice command to either initiate the call to the callee or to cancel such action. Additionally, in some non-limiting embodiments, the response options may include options to explore more information about the entity, e.g., additional third-party ratings, such as the Better Business Bureau, Yelp®, Google® reviews, web sites, and/or other collated synthesized information regarding the controlling entity, etc., and also to report suspicious use of the number in cases where the party controlling the number does not match the caller's idea of whom they intend to call. The explore more option may be presented within the dialer application, via the phone's messaging app in text or RCS, via a web browser and/or read aloud speech.

In non-limiting embodiments, the caller may also be presented with an option to add the authenticated contact to their Contacts/Address Book where the authenticated information is either directly saved or is presented pre-filled in the correct fields of the new entry (but still able to be edited prior to saving). This option may be presented prior to making the call and after completing the call. If the registered owner information cannot be verified, the caller may be presented with the option of removing a pre-existing contact from the Contacts/Address Book.

In non-limiting embodiments, the caller may be presented with this pre-call lookup prior to making every outbound call.

In non-limiting embodiments, the caller may be presented with this pre-call lookup information only prior to the first time the caller calls the number or the first time the caller calls the number under an existing authenticated registration date such that, if the phone registration record is updated, the system would require a new pre-call confirmation when presented with the new information.

In non-limiting embodiments, when a threshold number of suspicious activity reports is received, or when significant changes to published ratings data occur, e.g., positive or negative changes in the Better Business Bureau, Google®, Yelp®, Dun & Bradstreet, etc., this new information may be presented prior to making the next call to this entity. This information lookup may also be provided when an incoming call from the entity is ringing or after it has been answered. This information may be presented as a pre-call interruptive stage-gated step or, as call in-flight information during the dial/connection, or as post-call information.

In non-limiting embodiments, this information may be denoted by an authenticated ownership identity icon and a ranking/ratings section of the Contacts/Address Book that is retrieved automatically or retrieved via a click or voice action.

In non-limiting embodiments, warnings about callers may be presented at any time, before, during, and/or after the call has ended with corresponding actions the user can take, e.g., End Call, End and Report, Remove from Contacts, and Block Number.

In non-limiting embodiments, the lookup service may occur asynchronously with the initiation of the dial, may occur post-dial, or may start prior to the dial but may not return and present information until the call is in progress. Additional information may be presented during the call, such as active warnings regarding complaints and/or suspicious activities and, in some embodiments, based on the security settings of the application, the call may be automatically terminated upon reaching a threshold percentage of fraud reports on the number. The dialer application and/or the user's carrier may warn the user of a rise in suspicious activity reports and terminate the call if it finds issues, such as volume spikes in scam/fraud reports.

In non-limiting embodiments, when a phone number is clicked in a messaging application, the authenticated owner information is presented with an option to call (proceed) or cancel. This screen may also offer an "explore more" information option.

In non-limiting embodiments, in web browser listings, search results, and other information service providers, e.g., Google®, Bing®, Yelp®, etc., the browser may display the synthesized certified ownership information (e.g. logo, entity name, icon conveying vetted ownership of the number) next to displayed numbers, available via hover, via a click on an identity icon, and/or in a pop-up when clicking on the phone number text or hypertext tel-tagged telephone number itself. This information is presented along with the related action options, e.g., Call or Cancel. Additional options can include "explore more," "add to Contacts/Address Book," "report suspicious activity," and "provide feedback/ratings," as examples.

In non-limiting embodiments, when a phone number is displayed, the browser, search engine, web author, and/or email author may choose to display a clickable icon next to the phone number that conveys information regarding whether there is certified ownership information, non-certified information, or no information available regarding the telephone number.

In non-limiting embodiments, the same pre-caller ID service described herein may be applied to the telephone number in the messaging application such that an icon indicating the trust level and the registered brand associated with the phone number and messaging campaign can be displayed in the message application to inform the receiver who is sending the message.

In another non-limiting embodiment, with the voice or video channel, the caller/user may be apprised of the registered owner and associated reputation rating of the service provider they are considering connecting with. It can be appreciated that the source of the ownership information may be from an industry-sanctioned central database whenever possible and that the veracity of the information source may be attested to by the dialer or messaging application through a third-party source.

In a non-limiting embodiment, a long click/right click/click on a telephone number or short code anywhere it is published in communications media, such as in a text message body, the from number in messaging applications, email message bodies, and/or web pages, may provide direct access to authenticated ownership and related registered associated information and third-party ratings and reviews.

In non-limiting embodiments, anywhere a telephone number or short code is published in online media, such as in a text message body, the from number in messaging applications, email message bodies, web pages, when the user long clicks, double clicks, or right mouse clicks on the number, may provide direct access to authenticated ownership and related registered associated information such as logo, department, website URLs, social media handles, links to chat/message, and third-party ratings and reviews.

In non-limiting embodiments, telephone numbers and short codes in search engine results and other industry web site directory listings may provide the verified phone number/short code ownership information through a single click or mouse-over.

In non-limiting embodiments, the dialer and messaging applications do not automatically query and return the identity information but instead provide links to authenticate the registered service provider registered to use the number, including but not limited to organization name, logo, department, location, website, chat and/or messaging link, alternative numbers, ratings, and reviews.

In non-limiting embodiments, provided is a means to expand the entity search capabilities by telephone number and more broadly by entity name or category from within the dialer and/or messaging application, where the search results extend beyond the user's personal Contacts/Address Book and include prioritized results from the registered entity phone number, short code, and chat username database such that customer service numbers and numbers designated for inbound call support are prioritized in the listings. Departmental information may be additionally included to further refine results. All result information should specify whether the returned result is indeed an authenticated registered number for the entity in an industry association, e.g., CTIA, The Campaign Registry, Internet Engineering Task Force (IETF), Common Short Code Administration (CSCA), etc., sanctioned brand/entity, and telephone number/short code registration databases.

In non-limiting embodiments, the dialer application may preserve the authenticated logo, business name, and related business profile information accessible in the dialer application call history. For inbound calls attested via STIR/SHAKEN or a related proprietary caller ID verification the like to store these data elements as opposed to using a complete data object, such that items such as name, picture/logo, and reason for call, as examples, may be stored locally in the Call History of the user device (e.g., local database) while continuing to provide access to the other elements through the website (e.g., via a supplied URL). This attested caller identity and contact information may be additionally utilized by the user directly through the dialer application to report abuse, e.g., the user does not believe they had provided permission to the entity to call them on the user's telephone number, report that they are not interested, request to converse via text instead of voice, etc. The Rich Call History may contain any history of working with answering call screener assistant (e.g., such as the screening tool in Phone by Google® or other like tools that allow users to see transcribed text of a speaker and to ask questions and receive responses in transcribed text from speech), voicemails, transcripts, processed fraud alerts, fraud scoring of previous calls with the related entity and/or number, most recent messages exchanged with this number and with the entire related entity, call history threads with an entity even if they occur on different telephone numbers, short codes, and/or registered text messaging chatbots, as examples.

With regard to when a call is in progress, a "call in progress" begins when the signaling invitation goes out from the caller's network gateway/connection to an outbound telephony system to ring the callee's phone. A call in progress may start when the callee's telephony system responds back with the status of ringing, e.g., 100 Trying in response to a SIP (Session Initiation Protocol) invitation. The following are the details of how an outbound call may occur after clicking the dial button using the SIP protocol. With respect to calls made by SIP, the signaling that occurs is as follows in an outbound call example:

| No. | Time | Source | Destination | Protocol | Length | Info |
|---|---|---|---|---|---|---|
| 1 | 0.000000 | 54.172.60.0 | 208.72.189.242 | SIP/SDP | 1364 | Request: INVITE sip: . . . gy |
| 2 | 0.657153 | 208.72.189.242 | 54.172.60.0 | SIP | 637 | Status: 100 Trying |
| 3 | 0.269748 | 208.72.189.242 | 54.172.60.0 | SIP | 646 | Status: 100 Giving it a try |
| 4 | 17.391447 | 208.72.189.242 | 54.172.60.0 | SIP/SDP | 1255 | Status: 183 Session Progress |
| 5 | 18.573819 | 54.172.60.0 | 208.72.189.242 | SIP | 1293 | Status: 200 OK |
| 6 | 18.568671 | 208.72.189.242 | 208.72.189.242 | SIP | 849 | Request: ACK sip: +13 . . . 194 |
| 7 | 878.605572 | 54.172.60.0 | 208.72.189.242 | SIP | 644 | Request: BYE sip: +12 . . . 5600; transport = udp |
| 8 | 878.610769 | 54.172.60.0 | 208.72.189.242 | SIP | 676 | Status: 200 OK | service with a "reason for call" included in the rich call data, the call history may preserve the stated reason for the call. The user can review the "reason for call" and respond via text to telephone numbers that are set up to receive texts to the associated registered text messaging chatbot or to a customer service text number.

In a non-limiting embodiment, upon receiving a verified inbound call by the user, the STIR/SHAKEN Attestation Level A or related proprietary caller ID verification information may be displayed, which may appear as a green check mark with the caller ID verified, and additionally may include some or all elements of Rich Call Display information, e.g., the entity name, logo, web site URL, reason for call, vCard or jCard (e.g., or other electronic "cards"), additional information (e.g. name, photo, telephone numbers, email, location, title, role, department, categories, and note), and/or reason for the call. Some or all of these elements may be stored in the dialer application Call History. In non-limiting embodiments, an implementation of the Rich Call Display may use a publicly available website or In the above table, the server with the network address starting 54 . . . is the caller's server and the server with the network address starting 208 . . . is connected to the switch that actually makes the outbound call leg to the callee.

After the caller clicks dial from their dialer application, the caller's server sends the callee's telephony server an INVITE (e.g., invitation).

The outbound telephony server responds with a Status 100 Trying message or the like.

Then the callee's server responds with another Status 100 Giving it a try.

Then the callee's server responds with a status 183 Session Progress message—this can be a 180 Ringing status whereas the 183 Session Progress contains Session Description Protocol (SDP) data, which allows for regional ringback and carrier announcements as well. Typically, 183 contains SDP data and is used to play media before the call is connected. An example of this communication session flow according to non-limiting embodiments is shown in FIG. 7.

Figure 7:
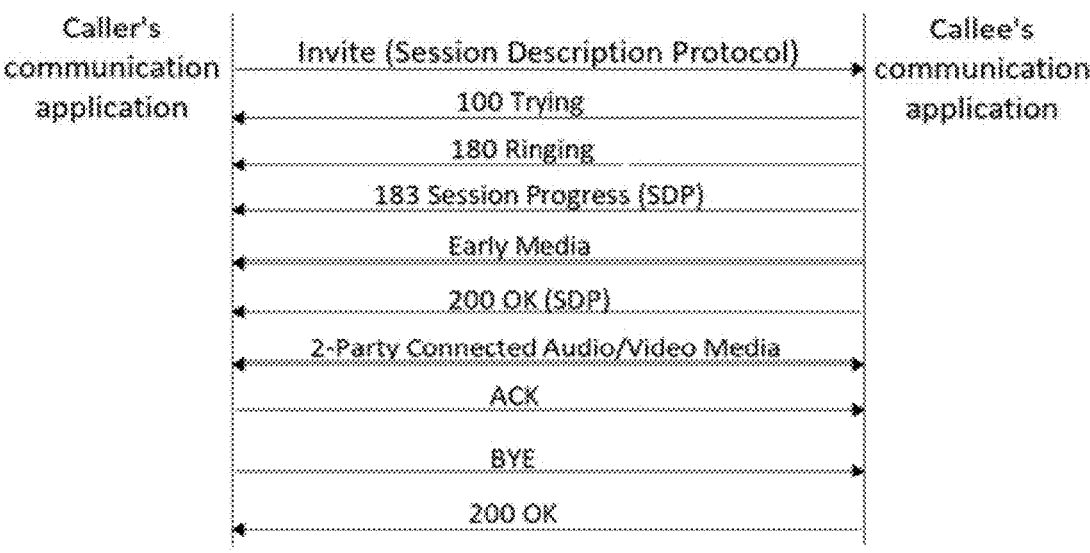
FIG. 7 is a sequence diagram for a communication session flow according to non-limiting embodiments or aspects.

In the sequence diagram shown in FIG. 7, early media is the "ringback" or other audio or video media provided by the callee's telephony system versus a ringing tone or other audio or video media that may be played by the other server. The IETF RFC 3960 defines early media as media (e.g., audio and video) that is exchanged before a particular session is accepted by the called user. Within a communications dialog, early media occurs from the moment the initial INVITE is sent until the User Agent Server (UAS) generates a final response.

Then when the callee's phone or answering service answers, the callee's server in response sends a status "200 OK" message.

Then the caller's server responds with status ACK (e.g., acknowledgement) message to acknowledge the call has been answered and provide some information about the media network location (e.g., Uniform Resource Identifier (URI) or the like) where the two-party communication is housed.

Once the call request INVITE message leaves the caller's gateway/telephony provider and is received by the outbound call leg telephony provider, the call is in progress based on the INVITE leaving the caller's system.

Although non-limiting examples above involve using SIP, it will be appreciated that non-limiting embodiments may be implemented using various different protocols. For example, VoIP and other communication protocols may use SDP data and/or other like data to connect calls.

In a non-limiting embodiment, when dialing an unverifiable telephone number, the warning to the caller begins once the invite has been sent out and may be played by either the caller or callee's telephony system prior to the callee answering the call.

In a non-limiting embodiment, when connected in a two-party call with an unverifiable telephone number, the warning about the unverifiable number or suspicious activity associated with said number may be played audibly and/or visually to the other party as a whisper (e.g., only audible and/or visible to one party) or audibly and/or visually to both parties. This can occur on an outbound call and also as an inbound call to the potential scam victim. The determination of suspicious activity may be made by software monitoring of the in-process call. In non-limiting embodiments, the software monitoring is performed by an artificial intelligence software agent configured for near-real-time transcription of the audio (e.g., transcription while audio is live and within seconds and/or milliseconds of the spoken audio). The content of the audio (e.g., the words, sentences, and/or the like) may be processed by one or more artificial intelligence learning models trained on data and configured for anomaly detection and/or threat intelligence based on input content to determine a security risk to the protected party. This can occur on an outbound call and also as an inbound call to the potential scam victim. When the software monitoring determines the content of the call is likely a scam or illegal phishing attempt, it will warn the protected party with audible and/or visual indications the call is likely a scam. Other actions the software can take include terminating the call, taking over the call wherein the artificial intelligence agent disconnects the protected party and continues the call, and/or bridging in a trusted human agent of the protected party.

It is known that phishing scams may start with an email or text message or web browser pop-up containing fraudulent information about the victim's bank, PayPal®, Amazon®, cable, utilities, package(s) for delivery, prize award delivery, suspicious recent purchase(s), e-commerce activity, and/or other accounts. Typically, the enticement is for the victim (e.g., caller or other end-user) to call a number for immediate assistance if the information does not seem to be correct. During the call, the scammer seeks to gain the trust of the caller or other user and may direct the caller or other user to navigate to a website, then to download a malicious application, such as but not limited to a screen-sharing application, keylogger, and/or Trojan horse application, and then to watch or monitor to attempt to steal usernames, passwords, payment account information, face identification (ID), and/or the like, while instructing and/or directing the victim of the scam to navigate to financial institution websites, ecommerce sites, email applications, social media applications, mobile applications, and/or the like, potentially remotely controlling the victim's computer, phone, tablet, or other connected device. Once the victim opens their computing device to screen sharing and/or remote control, as an example, the scammer may be able to steal progressively more information about the victim for immediate and/or delayed use to steal the victim's funds and/or identity. Part of this scam involves the user calling a number the user believes to be legitimate for a company they trust, e.g. PayPal®, Amazon®, their utility company, etc., and then while speaking with a scammer, the unsuspecting victim may share personally identifiable information such as birthdates, social security numbers, zip codes, mother's maiden names, and/or security related information, such as passwords, additional security questions or answers, or the like, during the call. Then, at the scammer's direction, the victim may begin accessing websites and downloading potentially harmful software. In the telephony portion of such scams and other scams, a telephone call can also begin as an inbound call to the victim (e.g., as a callee/recipient). It can also be appreciated that the voice portion of the communication may initiate directly through a website or application using embedded audio and/or video communications mechanisms. In these cases, the victim thinks it is connecting with an entity/organization it trusts but is unfortunately connecting with a scammer over an unverifiable/unregistered/false telephone number and/or fraudulent company profile.

An unverifiable and/or unregistered entity is an entity whose identity cannot be established and/or authenticated because the entity has not registered their telephone number, screen name, chatbot address, and/or the like with their associated business or organization, or their personal information to a vetted registration service such as a telephone number provider or an industry acknowledged, reputable, and/or sanctioned business registration service reputable identity matching organization, such as what Verizon® does with TNS (Transaction Network Services Inc), T-Mobile® does with First Orion, AT&T® does with Hiya, Google® does with its Google® business listings service and with the emerging CTIA's and iconectiv's Registered Caller initiative, and/or the like for outbound communications to said entity. In some examples, this may also apply to inbound communications to the user because, although the identifier/number/screenname may be registered, the authenticity of said inbound communication cannot be established such as on an inbound call bearing the lowest STIR/SHAKEN attestation Level of C.

For inbound calls and communication requests, the communications from said telephone number, chatbot, or online identity additionally must be able to be verified as legitimately arising from the verified entity (person, business, organization) or it shall be deemed as unable to be verified.

For inbound telephone calls this would be verified through a means such as SHAKEN/STIR Attestation Level A.

In the case of an outbound telephone call, the telephone number dialed must be verifiably associated with a known legitimate entity in a vetted registration service and/or specifically designated by the user by conferring a known identity status for a given contact added by user action to the user's contacts database.

In non-limiting embodiments, the system may warn the victim to be wary of continuing with the outbound or inbound call, but the emotionally unsettled victim may still continue with the call. To reduce the risk of speaking with a scammer, in some non-limiting embodiments, the system may automatically coordinate with the user's registered devices and/or login profiles, at the operating system level, in applications, in browsers and/or web pages (e.g., at the application level), and/or with the user's voice and messaging providers (e.g., at the service provider or network level) to prevent the downloading and/or activation of software programs and/or other phone applications and/or to prevent access to specific applications, authentication messages and phone calls, web sites, portal logins, web pages, and/or the like while the user is conversing with any other party or when conversing with unapproved, non-registered and/or non-verifiable entities, while the call (inbound or outbound) is in progress and/or being established, or before the call is commenced. In non-limiting embodiments, the applications which the protected party is prevented from accessing includes applications specifically utilized for two-factor authentication (2FA) and/or related identity verification tests including text messaging applications, authentication applications such as Google® Authenticator, Twilio® Authy, and/or the like, and by preventing access to second lines on the existing user voice device, prevention of access to call waiting, and prevention of authentication calls to other registered phone numbers of the protected party. The prevention of access to these two-factor authentication channels may be accomplished at the provider level such as the protected party's text messaging provider or phone service provider, or at the device level to directly prevent access to said applications and/or specifically blocking access to authentication messages, or may occur in combination with prevention occurring at both the provider and at the device level. It can be appreciated that blocking of specific messages may include password reset codes and the like. It can be further appreciated that email and text message applications may be configured to prevent forwarding of link and codes when scam prevention mode has been activated. Scammers of human and artificial intelligence nature seek to gain the victim's trust through the voice conversation with the victim. Therefore, this synchronized blocking mechanism of accessing all or specifically protected applications, authentication messages, and/or web sites when voice communication connection is established will thwart the ability of scammers to take control of the victim's computing devices and to access the protected party's personal and/or financial information. In non-limiting embodiments, the system may commence active software monitoring of the communications via real-time transcription and processing, which may be performed and/or augmented with artificial intelligence models, to detect in progress potential scams and security threats (e.g., scams or threats currently happening on an ongoing call or after a call) and to alert the protected party and/or terminate the call. The system may, in non-limiting embodiments, determine between automatically alerting and automatically terminating, depending on the level of active protection configured in the software. It will be appreciated that various different thresholds (e.g., such as a risk threshold) may be used to determine what automatic action to perform.

In a non-limiting embodiment, the system may block access to certain or all web sites while conversing with non-registered and/or non-verifiable entities while the call (inbound or outbound) is in progress and/or being established, or before the call is commenced.

In a non-limiting embodiment, the system will communicate with registered devices, websites and software applications and redirect the user to pages and content that warns the user of an active potential fraud attack and presents one or secure means for the user to contact the registered website and/or application for legitimate customer support.

In a non-limiting embodiment, the system will prevent a user from accessing a specific registered entity's web sites and applications if the user is connected via audio/voice and/or video communication with any entity other than said entity's permitted numbers and/or online profiles (e.g., as verified through a registration process or the like) and an identity control mechanism, such as the user either initiating communication with a registered number and/or online profile, or via an inbound communication to the user through a verifiable identity control system such as having a minimum STIR/SHAKEN attestation level that may be associated with permitted entities. In this manner, the entity protects the user from accessing the entity's online resources when the user is in engaged in active communication with unauthorized persons. The entity is thereby enabled to block access to specific online resources when the user is speaking or otherwise communicating with anyone other than the authorized personnel of the entity that controls those online resources. For example, a banking or peer-to-peer (P2P) money transfer application may, upon being opened by a user, detect if a communication (inbound or outbound) is ongoing and, in response to detecting the communication, determine if the other party to the communication (i.e., remote from the user device) is affiliated with the application. For example, the banking application may compare the telephone number or other identifier to a list of trusted and/or verified numbers and, in response to determining that the telephone number is not on the list of trusted and/or verified numbers, block access to the banking application. This may involve an alert to the user, an operating system-level locking of an application, an application-level locking of an application, and/or the like. It will be appreciated that the detection may also occur before or during the time the call is being connected and/or while the call is in progress. It will also be appreciated that the voice communication requiring protection may be broadcast directly to said protected applications and protecting service providers such that, when the protected party attempts to access the blocked applications, web sites, messages, and/or phone calls, access to their functionality is blocked.

In some non-limiting embodiments, the system may be configured to terminate the voice communication connection and/or the telephone call when any or a combination of the above-described activities is detected.

In non-limiting embodiments, a trusted third party such as a caregiver or security operator can be alerted and/or bridged into the call with the ability to notify the suspected scammer and/or the victim and take over control of the voice communication to terminate the call and/or any computer programs and/or services running on devices operated by and/or associated with the victim. The security operator may be human or may be artificial intelligence powered by software programming and/or a generative artificial intelligence model. The security operator may be, for example, a monitoring software agent/software program (e.g., bot) that automatically processes the real-time transcription of the audio to identify keywords and/or context, and/or that uses one or more artificial intelligence (AI) models configured to use data sets and algorithms to detect patterns and recognize (e.g., classify) unwanted conversations such as scams and phishing activity. The processing model(s) may be trained on data sets of prior audio conversations and associated outcomes/decisions to recognize keywords and patterns and/or make decisions without human intervention. The AI model(s) and algorithm(s) may incorporate other data elements to determine context and security risk level, such as but not limited to contemporaneous web site activity and/or phone applications reported by registered devices, browsers, web sites, phone applications, and/or the like associated with the protected parties. Other input data, input parameters, and/or training data may include, for example, recent call volume from or to the other party number in the community as determined by telephone network operator data, "honeypot numbers" used by certain entities to detect and categorize unsolicited activity related to the other party number, scam reports related to the call volume between the other party and the protected party (party using the monitoring protection service), whether an inbound calling party is verifiable through STIR/SHAKEN attestation level A (which is the highest attestation given by the originating service provider to indicate that the caller is known and has the right to use the phone number as the caller ID), outbound calls to a number wherein said number has a verification from a reputable phone number registration information provider that the called number is duly and legitimately registered to an accredited organization, branded caller ID information supplied by a carrier or dialer application, and/or the like.

In a non-limiting embodiment, the telephone call recording, monitoring, and/or transcription along with any requisite statutory notifications that may be required by law may be automatically activated whenever a person calls or receives a call or may be activated only when a person receives calls from an unregistered unverifiable number and/or caller, or number who's ownership and/or initiation of the call is unable to be identified and verified, and in such examples said statutorily required announcement can be played when the system detects that both parties are connected together. It can be appreciated that the same mechanism can be utilized when receiving inbound calls or activated only on inbound calls when the calling party does not have a sufficient identity attestation level such as not having a STIR/SHAKEN (STIR—Secure Telephone Identity Revisited where STIR is a protocol developed by IETF, describing the process of verifying if a party is allowed to use a certain number) Attestation Level A, which indicates the identity of the caller is known, and they are legitimately permitted to use the Caller ID for this call. In non-limiting embodiments, the software processing of the audio and associated transcription may automatically trigger termination of the call or the bridging-in of a caregiver, security operator, and/or designated party into the call, and said recording and transcript may be used in a court of law in legal proceedings against scammers and/or in other tribunals or reports. The transcription and processing may be performed in real time or near real time (e.g., with an imperceptible delay or within seconds or milliseconds) by an autonomous monitoring and protective software agent configured to use natural language processing (NLP), machine learning (ML), large language models (LLMs), foundation AI models, generative AI models, and/or the like to process the transcribed conversation for content, call context, phrases and questions, and also to process the nature of the speech along with any contemporaneous related text, audio, or video messaging activity on the protected party's devices. The transcription and processing may occur local on the operating system or dialer application of the device operated and/or associated with the protected party, or may be performed remotely via streamed audio with cloud servers and/or at telecommunications switches. This processing may include information to help detect context and/or emotional state by categorizing intonation, inflection, tone, volume, speed of speech, and/or the like, and to detect and score the likelihood of whether the other party is a human or an artificial intelligence or some combination thereof. The real-time software processing may be used to detect context, keywords, high risk questions and/or the like for requesting social security numbers, usernames, passwords, password hints, password reset security questions, middle names, a parent's maiden name, prior street addresses, employment information, Personal Identification Numbers (PIN), two-factor authentication codes, identity verification tests, passkeys, directions to provide biometric input to verify access to apps/websites/content, transmission of high risk security information such as banking pins, P2P money transfer login PINs, email addresses, credit card numbers, account numbers, gift card numbers, gift card PINs, gift card redemption codes, directives to move financial assets, directives to download software, directives to accept screenshare requests, purchase gift cards, provide cash, and/or the like, directives to engage with a messaging or email application and/or to click a link, directives to meet in a specific location, come alone, provide cash or items of value when a courier arrives, and/or the like. The system may also categorize the nature of the conversation (e.g., through predictive classification) and compare the results of said processing progressively as the conversation continues, to continuously assess the security risk posed to the protected party, and to automatically take action when a predefined security threshold/level of risk is breached. The assessment of content may also include assessing a misrepresentation such as the other party claiming to be someone they are not or claiming to work for a company they do not work for, as determined by comparing the content from the other party with verifiable information about the identity of the other party's phone number. This verifiable information may include registration information on an outbound call and the identity information ascertained from STIR/SHAKEN on an inbound call to the protected party combined with registration data for the caller ID number of the inbound call. The security action taken by the software may include warning the user on the user device with a visual and/or audio alert, audio blocking (e.g., preventing output of audio), and/or terminating the call to prevent harm to the protected party. Additional security actions may include notifying security and/or caregiver resources (e.g., through registered and/or associated telephone numbers, email addresses, and/or the like) when the autonomous monitoring and protective software agent determines that allowing the call to progress is likely to result in financial, emotional, physical, and/or any other type of harm to the protected party. The termination/ending of the call may be initiated directly through the protected party's dialer application or device operating system or, if the software processing is occurring on a separate device or server, the termination may be performed via an API, SDK, or custom software integration to one of the communications providers involved in the call connection, to the dialer application, to the protected party's device operating system, and/or directly to a network telecommunications switch. Once the call is terminated, the system may automatically inform interested parties about the security breach and may inform the protected party what was detected and offer additional assistance as determined and/or warranted by the specific situation and the nature of the risks detected. Additionally, the information about the scammer, the number involved, nature of the scam, and/or the like may be shared with one or more scam prevention databases and the depersonalized information may be used to further train and/or tune the artificial information model being used to power the monitoring software agent.

In non-limiting embodiments, notification to third parties may be initiated if the caller attempts to download any application or other software, access sensitive websites or applications, and/or access unregistered or otherwise insecure websites while engaged in voice communications.

In non-limiting embodiments, the browser, device, and/or application store may be configured to block the download of screen-sharing applications and/or all attempts to download and/or activate already installed software or applications by the victim may be blocked and/or prevented, including blocking web site access, while the user (e.g., potential victim) is engaged in voice communications with any entity other than a verified, permitted entity.

In a non-limiting embodiment, while a victim is engaged in voice communications with an unverified entity, attempts to access registered and/or sensitive websites and/or unregistered or otherwise unsecure websites and/or to activate registered and/or sensitive applications are blocked and/or in the case of registered sensitive applications and websites, the protected party may be redirected to a security notification page with authorized legitimate contact information for the registered entity.

In a non-limiting embodiment, when on a call where potential scam activity is detected and/or on a call with an unverifiable caller or callee, the protected user's browser and/or application store may be configured to notify permitted concerned third parties, alerting the concerned parties (in addition to the protected user) that the caller/user is attempting to visit web sites and/or IP addresses, noting for example if the caller has not previously visited these pages or addresses prior to the voice communication session/call. The protected user's browser and/or application may block access to said web pages, and/or block downloads and/or activation of software while on such calls.

In a non-limiting embodiment, distinct warnings to the user may appear when the user attempts to access financial institution sites, browser password stored settings, password keeper applications, face ID, finger ID, other biometric logins, and/or the like while on such calls with unverifiable entities and/or on calls where potential scam activity is detected by the monitoring agent. For example, when the protected party answers the call either during the bridged media or separately just prior to connecting the two parties the system outputs or says "This call is being actively monitored to prevent scams and recorded to prosecute scammers" or the like by either playing a pre-recorded message or using a speech-to-text voice. These types of recording and monitoring announcements may be required by law if any of the parties involved in the call reside in an all-party notification state. Adding language to the announcement that the call is being real-time transcribed and processed to detect and mitigate scams and fraud provides an extra layer of deterrence for scammers. In a non-limiting embodiment, the extent of the scam deterrence messaging included in the announcement may be tailored by the verification level (STIR/SHAKEN attestation level on an inbound call or verifiable registration status of a call to an outbound number) of the other party's inbound call or telephone number on an outbound call.

In a non-limiting embodiment, web site navigation may be further regulated to prevent access to non-secure and fraudulent phishing sites.

In a non-limiting embodiment, the blocked application, software program, or website contains screen sharing capabilities.

In another non-limiting embodiment, the calls with unregistered/unverifiable numbers may be transcribed and if the potential victim begins reciting or transmitting, via keypress, more than two numbers in sequence, indicating a pin or account number, the audio communication may be automatically blocked and the call may be automatically terminated. It can be appreciated that the autonomous monitoring, transcribing, and processing security software agent may automatically interrupt the call based on (e.g., in response to) detecting phrases or questions from the potentially risky party such as "provide me with your social security number," "provide your account number," or the like, prior to the protected party even beginning to provide the requested information. The audible and/or visual warnings may appear in response to the detection of a high risk question and then the call termination or audio blocking may occur as the protected party begins providing the requested information. It can be further appreciated that the autonomous software agent may monitor and prevent messaging of the high risk information from being sent from the protected party's device(s) while the call is ongoing and/or proximate in time (e.g., several seconds, minutes, hours) after the call after has ended. It can be further appreciated that the transcription and processing may be performed in real-time by an autonomous monitoring and protective software security agent AI model for enhanced speed. Performing these actions directly on the protected party's device user communication device, on the protected party's device operating system, on a phone/dialer application of the user device, on another application of a user device, and/or the like, may have lower cost and lower latency than using cloud-based processing. However, cloud-based processing may be used in non-limited embodiments. To provide improved protection, speed should be prioritized to effectuate immediate warnings and, where warranted, to cause immediate termination or otherwise blocking of the audio to prevent transmission of sensitive information.

In non-limiting embodiments, when a security threshold has been triggered, such as an outbound call being made to an unverifiable number a call with contemporaneous attempts to download software or access web sites not previously visited, or a call wherein personal numeric information is requested, a message may be automatically sent out to subscribed concerned third parties with the option of bridging a third party into the ongoing call or where the notified security or caretaker can take over the call.

A security threshold may be a pre-configured level based on the on-going security assessment of the in-process call where the autonomous software determines if the extent of financial, emotional, and/or personal risk to the protected party warrants action to warn and/or prevent harm to the protected party. For example, the software may generate a score within a range and the threshold may be a predetermined score that is satisfied if the score for a given call meets or exceeds the threshold. It can be appreciated that the high risk sensitive information requested by the unknown party may include passwords, account numbers, social security numbers, PINs, password reset security question answers, and/or other personally identifiable information. Part of the algorithm to determine the security risk and whether a call has breached security threshold may include processing messaging content, email content, and activity that occurred prior to the call and during the call. It can further be appreciated that this may occur on inbound calls to the protected party and on outbound calls from the protected party. It may be performed in some non-limiting embodiments by transcription software and processing software, which collectively may be referred to as an autonomous software agent, that would be running on the protected party's device operating system, device dialer, in the cloud via an audio stream, and/or directly on the carrier's telecommunications system.

As used herein, the terms "dialer" and "dialer application" are used to signify a phone call management application on the protected party's device. This may commonly be referred to as a phone application or phone application and may be native to the operating system or device manufacturer or may be a third-party application.

As used herein, the term "protected party" may refer to the person or entity using the autonomous monitoring and protective software agent for protection from scams. The other party (e.g., potentially risky or high-risk party) is the other entity or person (or automated bot using AI or the like) connected on a telephone call with the protected party.

In a non-limiting embodiment, when the caller makes calls to high-risk and/or unregistered numbers, notification messages on subscribed numbers, emails, and/or devices are triggered so that the concerned party, such as a caretaker or family member, can be notified of the activity.

In a non-limiting embodiment, there may be an option to join the call so that the caretaker/family member can assess and participate in the call. An additional option for a concerned registered party is to terminate such call and block additional calls to/from that number and report phishing scam automatically including any recordings and transcriptions.

In a non-limiting embodiment, a notice may be played on every outbound call once the conversation begins (e.g., as detected by streaming media or the like), such that the system automatically plays a message wherein both parties are notified the call is being monitored, recorded, and may be transcribed for use in prosecuting any fraudulent activity or the like. For example, when the called party answers the phone and completes their greeting, e.g., "hello," the system plays or says "This call is being actively monitored to prevent scams and recorded to prosecute scammers" or the like by either playing a pre-recorded message or using a speech-to-text voice.

In a non-limiting embodiment, a notice may be played on every inbound call or only on inbound calls from a high-risk caller and/or caller whose identity cannot be verified, wherein upon answering, the system detects that the parties are connected from the streaming media, and the system automatically plays a message such that both parties are notified the call is being monitored, recorded, and may be transcribed for use in prosecuting any fraudulent activity. For example, when the protected party answers the call either during the bridged media or separately just prior to connecting the two parties, the system plays or says "This call is being actively monitored to prevent scams and recorded to prosecute scammers" or the like by either playing a pre-recorded message or using a speech-to-text voice.

These types of recording and monitoring announcements may be required by law if any of the parties involved in the call reside in an all-party notification state. Adding language to the announcement that the call is being real-time transcribed and processed to detect and mitigate scams and fraud provides an extra layer of deterrence for scammers. In a non-limiting embodiment, the extent of the scam deterrence messaging included in the announcement may be tailored by the verification level (STIR/SHAKEN attestation level on an inbound call or verifiable registration status of a call to an outbound number) of the other party's inbound call or telephone number on an outbound call.

In non-limiting embodiments, institutions that handle sensitive financial and personal data, e.g., financial, mortgage, medical, insurance, etc., can proactively register their web sites and applications to participate in the blocking system such that the system can prevent their customers from accessing these sensitive portals, sites, and/or applications when on calls with non-permitted entities such as verifiable but not permitted to engage in communication while accessing said web sites and applications or entities deemed as high risk and/or entities whose identity cannot be verified.

In a non-limiting embodiment, the system may block any use of screen share software and applications while on a call or engaged in other voice communications with a number, chatbot, or screenname/username whose identity is unable to be authenticated as a permitted entity to engage in communication with while accessing said screen-sharing software and applications.

In a non-limiting embodiment, the system may redirect attempts to login to registered sensitive websites like banks and/or mortgage companies, payment services like PayPal®, P2P money transfer applications, and/or ecommerce services like Amazon® such that, once these institutions' registration of their website and applications for this service, when the user attempts to access their sites while on the phone or in other voice communications with an non-permitted or unidentified entity the website and/or applications may automatically redirect to a warning page that includes the institution's registered and/or verified phone numbers for discussing their account securely. In this embodiment, the user is only able to access said registered websites, applications, and screenshares when the user is not engaged in voice communications with a non-permitted or unidentified entity.

In non-limiting embodiments, the protected party is not able to access registered sensitive websites or applications when the protected party is engaged in voice communications with any other party on the phone or via other communications applications.

In non-limiting embodiments, the protected party is not able to access registered sensitive websites or applications when the protected party is engaged in screen sharing with any other party. In non-limiting embodiments, the system may block access to registered sensitive websites and/or applications when a user is connected to a screenshare unless the screenshare instance and application are specifically sanctioned for the registered entity's self-administered customer service.

In non-limiting embodiments, the system may block all use of screenshare on specific applications such as web browsers, phone applications, contacts databases, and/or the like, unless specifically sanctioned by the publisher of said web browsers, phone applications, contacts databases, and/or the like.

Figure 5:
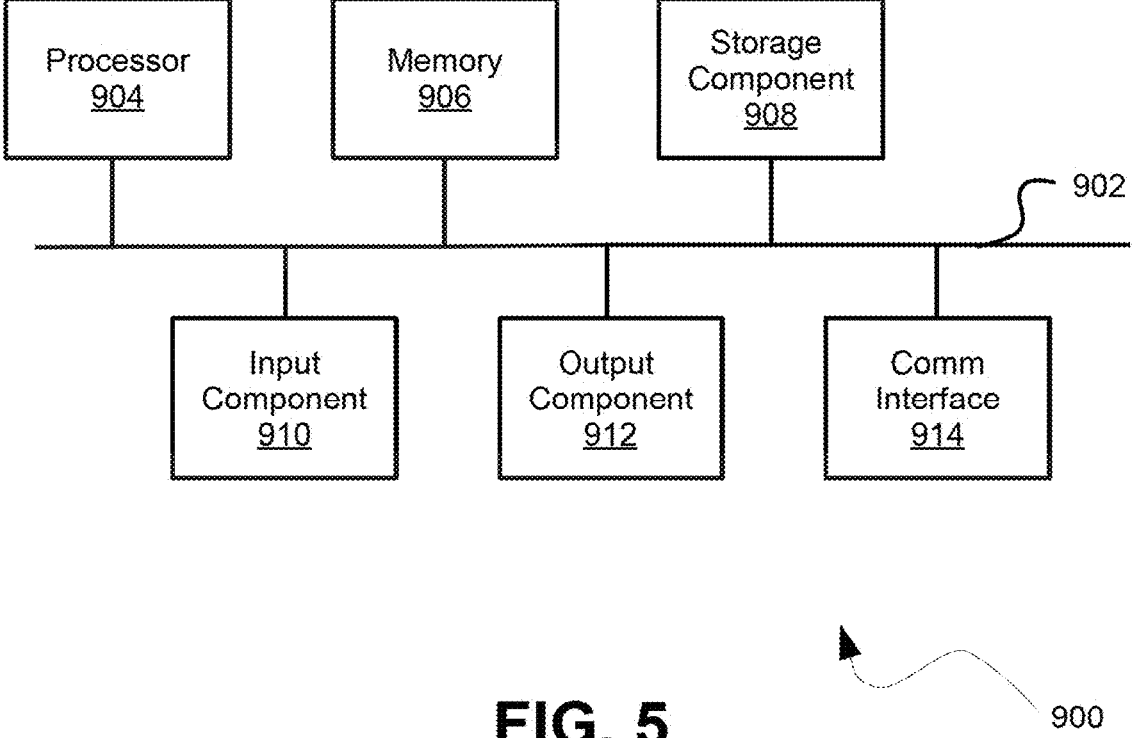
FIG. 5 illustrates example components of a computing device used in connection with non-limiting embodiments.

Referring now to FIG. 5, shown is a diagram of example components of a device 900 according to non-limiting embodiments or aspects. Device 900 may correspond to the user device and/or any other computing device described herein. In some non-limiting embodiments or aspects, such systems or devices may include at least one device 900 and/or at least one component of device 900. The number and arrangement of components shown are provided as an example. In some non-limiting embodiments or aspects, device 900 may include additional components, fewer components, different components, or differently arranged components than those shown in FIG. 5. Additionally, or alternatively, a set of components (e.g., one or more components) of device 900 may perform one or more functions described as being performed by another set of components of device 900.

Figure 6:
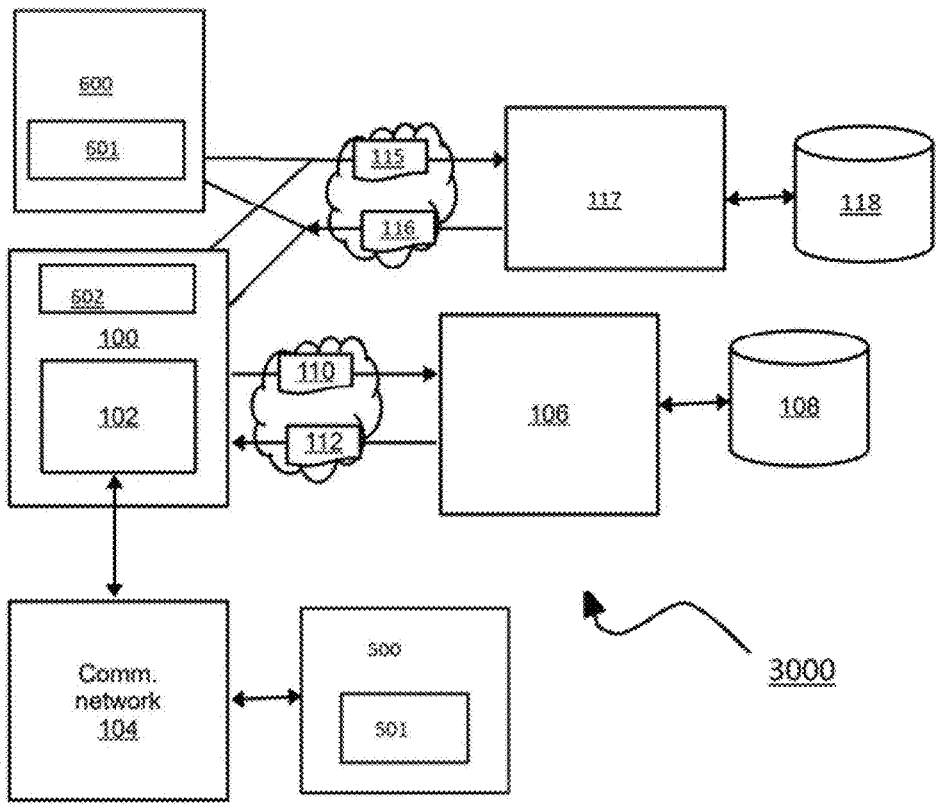
FIG. 6 is a diagram for a system for initiating outbound communications from a user device according to non-limiting embodiments or aspects.

Referring to FIG. 6, shown is a system 3000 for initiating outbound communications from a user device according to non-limiting embodiments or aspects. A user device 100 may include a computing device such as a mobile phone (e.g., smartphone), tablet computer, personal computer, and/or the like. The user device 100 may include a communications application 102 installed thereon. The communications application 102 may include, for example, a dialer application, a text messaging application, and/or the like. In some examples, the communications application 102 may be a native dialer application or messaging application (e.g., such as an Android® or iOS application); however, it will be appreciated that various other communications applications may be used, such as Google® Voice, Phone by Google®, Messages by Google®, Zoom®, Meta™ Messenger, and/or the like. The user device 100 may include a set of one or more protected additional applications 602 installed thereon. The communications applications 602 may include, for example, a website browser, a phone application such as a banking application, P2P payment application or website, screen share application, and/or the like. A second user device 600 may include a computing device such as a mobile phone, tablet, or personal computer. A set of user protected applications 601 may include one or more protected applications running on the user device 600. Both user devices 100 and 600 are in communication with a remote server 117 and remote database 118 via request messages 115 and return control messages 116. A second user device 500 and voice communications application 501 are connected via at least voice communication to the user device 100, wherein the identity of the second user device 500 and communications application 501 cannot be authenticated and, because of this identity failure, user applications 602 and 600 may receive controlling messages from the remote server 117 to block normal functioning of applications 601 and 602 to prevent security breaches when the voice connection is established between user devices 100 and 500.

In non-limiting embodiments, the blocking of applications, web sites, and functions within an application, such as authentication and password reset messages within a messaging application and the like, relies on a system registry wherein each registered application and/or registered website has permitted entities, e.g., official company phone numbers and/or official company public registered user profiles. Companies that wish to participate in this security program may register their applications, e-wallets, web sites, and/or the like on this system registry that may be maintained by a third-party service provider, and/or any other entity or group of entities.

In addition, each user may have a registry of personal individuals and/or entities, represented by phone numbers and/or registered user profiles which the user deems safe, that are provided full access or are provided access to specific applications. Access means that, when the user is in communication with the verified and registered other party, blocking is not implemented for the user on the accessible locations as determined by the access permissions in the user's registry.

In such non-limiting embodiments, there may be a presupposition (e.g., a default setting) of blocking all applications, specified functions within applications, and/or web sites accessible on the user's devices and/or through user accounts and/or user profiles, and it is only when the user is in communication with verified and registered entities that partial (e.g., some applications and/or functions) or full access (e.g., all applications and/or functions) is permitted. In non-limiting embodiments the access may be revoked for a period of time even after a communication ends if a monitoring service detects scam activity and/or activity that is determined to be a security risk on the voice communication.

In non-limiting embodiments, the user's device or their network communications operator/carrier may determine that a communication has started, e.g., that an outbound call has been initiated/dialed or an inbound call has requested the user device to ring. The user's device or their network communications operator/carrier then checks for whether the identity of the other entity is verified or not and, if verified (e.g., in response to determining the other entity is verified), checks against the system application registry, website registry, and/or the user's personalized registry entries to determine the level of blocking to apply to the user's associated devices and/or registered and associated user profiles.

In non-limiting embodiments, the user's registered devices and registered login accounts, such as a Google® Account, Apple® ID, and/or the like, may be notified of the communication and the associated restrictions by the user device and/or by the user's communication provider/carrier. In the case of a landline phone, the notification that a call is in progress may be performed by the user's communication provider/carrier. The notification may be broadcast out to subscribers or may update a registry or registry cache with the call-in-progress status for the user and the associated permissions or blocking status. The applications and/or functions may then be blocked on every participating access means, e.g., at the registered application irrespective of the access method, at the user device, at the user device operating system, at the user account level on any device (e.g., Apple® can block specific web sites on its Safari® browser, block Safari® web browser access completely, block Apple® Pay, and/or the like, and Google® can bock specific web sites, associated user accounts, Google® Pay, applications, and the like).

In non-limiting embodiments, on a user device that is a mobile smart phone, for example, the processing to establish and/or detect that a communication has begun, which triggers the determination of the other party's identity and then the further determination of the security threshold, may be initiated and/or performed by the user device itself and/or at the user's communications provider/carrier level on a remote server or network switch. With a landline, however, the processing to establish that an active communication has begun may occur at the communication provider level switch and/or remote server. The start of the communication, e.g., the SIP Invite event on a SIP communication telephone call or the establishment of the two-party audio connection, serves as the initial trigger to perform the identity validation check. On an inbound call, this identity verification may be determined by the SHAKEN/STIR attestation level of the call as level A, B, or C or missing/not transmitted, and this information is communicated from the calling party's originating communication service provider/carrier switch to the called party's communication provider. This identity verification level can then in turn be communicated to the user device, which is configured for receiving such information at the application level and/or operating system level, as examples. In this embodiment, the positive identification of a full level A attestation signifies the service provider has authenticated the calling party and the calling party is authorized to use the calling number. An example of this case is where the inbound caller is a subscriber registered with the originating telephone service provider's softswitch, such that the service provider can positively attest the identity of the caller. On an outbound call, the identity is defined by the number dialed.

In non-limiting embodiments, once the identity is established, an entry in one or more databases may be updated to indicate the protected party/user and what applications, functions within applications, and/or web sites should be blocked for that user to assist in preventing scam activity.

User devices, device operating systems, browsers, web sites and applications with user accounts and profiles, and/or the like may be notified and/or can look up/query whether to allow or block access to their associated functions based on database entries for the registered web sites, applications, browser(s), user accounts, and core device functions such as downloading software and launching screen share functionality. If the database returns a "blocked" status for the listed sites, applications, and/or functions within applications, such as screenshare and downloading functions, then the sites, applications, and/or functions within an application, including but not limited to the ability to download software and engage in screenshare, would apply the block. These blocks may stay in place and remain active until such time as the next query or attempted use or login requests a status for the user and receives a "permitted access" response. It can be appreciated that the removal of the blocks may also be broadcast to the subscribing web sites and/or applications in some non-limiting embodiments.

It will be appreciated that while queries to a database are described herein, in non-limiting embodiments such queries may be made to cached database values (e.g., in memory outside the data structure of the database) where the database updates the cache continually and/or on a set interval. In such examples, all participating applications and web sites may read only the values from the most recent centralized cache query results. It will be further appreciated that information retrieval may also be accomplished by using a central broadcast to subscribing devices, databases, applications and web sites such as with WebSockets, and/or the like.

It will be further appreciated that the device operating system, the user's dialer application, and/or a communications provider associated with the device may store a temporary data structure (e.g., list or table) including record entries of the user's permitted and blocked applications and web sites. Such a temporary data structure may be used as the repository store that is queried by the applications and web sites to determine how much access to permit. The associated permissions controlling which if any applications, functions within applications, and/or web sites are permitted or blocked is established by querying for the called party's telephone number in one or more databases. In the case that a telephone number is found, the participating company has registered their permitted sites and applications and/or where the user has registered safe phone numbers of trusted entities with an associated indication of permitted applications and website permissions, e.g., all restricted, no restrictions, or specific restrictions. Depending on the system configuration for the user, the absence of a found identity (telephone number or registered username) entry in the registration database would indicate prevention of either all applications and websites, e.g., a complete block, or would indicate a partial block of only the registered websites and applications for companies participating in said registry and also block the user's access to identity authentication mechanisms such as text messages, email messages, and/or two-factor authentication applications on the user's devices and logged in user accounts and/or user profiles.

Once a call has ended, the user status in the database may be updated and any blocks are thereby removed by the updated user call status.

The blocking may be effectuated by one or more of disallowing login, immediate logout of previously logged in status to a web site or application, complete prevention of access to launch applications on a user device, browser level blocking of access to pages, and/or the like.

In non-limiting embodiments, the blocking may be configured to not automatically start upon the initiation of the call or upon the two-party audio is bridged, but only when a real-time monitoring service has determined a security risk (e.g., that a potential scam activity is taking place). In non-limiting embodiments, the monitoring software agent may be listening and transcribing the audio in real-time, processing the audio for keyword spotting, recitation of numbers, and further processing with AI and machine-learning models to identify scam activity is taking place. Once a security threshold has been breached by this monitoring and processing software agent, the database is updated to apply the appropriate blocks and, in certain cases, may potentially override a previously permitted (not blocked) status to start preventing access/blocking. In such cases the detection of scam activity may extend the block for a period of time beyond the communication/telephone call end to assist prevention of residual scam activity occurring through other calls, other numbers, and/or other means of communication. For example, the block may extend, for example for one hour, or it may last until such time as a security procedure is followed to remove the blocks.

As shown in FIG. 5, device 900 may include a bus 902, a processor 904, memory 906, a storage component 908, an input component 910, an output component 912, and a communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising at least one processor configured to:

detect a communication request for a communication between a protected party and a second party, the communication originated by the second party in conjunction with an originating service provider or originated by the protected party;

in response to determining the communication originated from the second party:

determine if an identity of the second party is verified by the originating service provider based on at least one of STIR/SHAKEN attestation or a network operator;

in response to determining that the identity of the second party is not verified by the originating service provider or a network operator, automatically monitor audio of the communication in real-time;

in response determining that the identity of the second party is verified by the originating service provider or a network operator, initiate a search in a database maintained by the protected party based on an identifier of the second party;

determine if the identifier of the second party matches an entry in the database based on the search;

in response to determining that the identifier of the second party does not match an entry in the database, automatically monitor audio of the communication in real-time; and in response to determining that the identifier of the second party matches an entry in the database, allowing the communication to progress without monitoring audio of the communication in real-time; and in response to determining the communication is originated by the protected party:

initiate a search in a database maintained by the protected party based on an identifier of the second party;

determine if the identifier of the second party matches an entry in the database based on the search;

in response to determining that the identifier of the second party does not match an entry in the database, automatically monitor the audio of the communication in real-time; and in response to determining that the identifier of the second party matches an entry in the database, allowing the communication to progress without monitoring audio of the communication in real-time.

2. The system of claim 1, wherein the at least one processor is further configured to notify a third party or an artificial intelligence system in response to determining a security threshold is satisfied on the monitored communication between the protected party and the second party.

3. The system of claim 2, wherein the at least one processor is further configured to provide an option to the third party to at least one of: join the communication, takeover the communication, or terminate the communication for the protected party.

4. The system of claim 1, wherein the at least one processor is further configured to automatically add a security operator to the communication in response to determining a security threshold is satisfied on the monitored communication between the protected party and the second party.

5. The system of claim 1, wherein the at least one processor comprises at least one of the following: a processor of a user device operated by the protected party, a processor of a remote server computer, or any combination thereof.

6. The system of claim 1, wherein automatically monitoring the communication comprises:

automatically transcribing audio of the communication to a transcription in real-time; and analyzing the transcription for content comprising at least one of the following: a misrepresentation of identity, a directive or an instruction, a question or prompt for personally identifiable information, a website, an application, a number, a code, a username, financial information, a social security number, a dual tone multifrequency digit, or any combination thereof.

7. The system of claim 6, wherein the at least one processor is further configured to determine a security threshold is satisfied on the communication between the protected party and the second party based on inputting the transcribed text into at least one of the following: an algorithm, an artificial intelligence system, a machine-learning model, a natural language processing model, a large language model, a foundation artificial intelligence model, a generative artificial intelligence model, or any combination thereof.

8. The system of claim 1, wherein the database maintained by the protected party comprises a safe list separate from a contacts database.

9. The system of claim 1, wherein the at least one processor is further configured to:

retrieve and/or receive registration information associated with a verified identity or lack thereof of the second party during the communication, wherein the at least one processor is further configured to automatically monitor the communication in response to determining the registration information is not associated with the verified identity and the identifier of the second party matches the entry in the database.

10. The system of claim 1, further comprising determining a security threshold is satisfied on the communication between the protected party and the second party, wherein in response to determining that the security threshold is satisfied, a warning is automatically presented to the protected party, and wherein presenting the warning comprises at least one of displaying a visual warning or emitting an audible warning on a user device operated by the protected party.

11. The system of claim 1, wherein the at least one processor is further configured to:

in response to determining that a security threshold is satisfied on the communication between the protected party and the second party, prompt the protected party through a user device operated by the protected party to select at least one selectable option from a plurality of selectable options comprising at least two of the following: an option to confirm the communication, an option to cancel the communication, an option to retrieve information about the second party, an option to report the second party, an option to bridge in a third party to the communication, an option for the protected party to provide control of the communication to a third party comprising a human or artificial intelligence, an option to notify a third party, or any combination thereof.

12. The system of claim 1, wherein the at least one processor is further configured to:

in response to determining that a security threshold is satisfied on the communication, automatically block and/or terminate at least one function in at least one application associated with the protected party, the at least one application executing on at least one of the following: a user device of the protected party used for the communication, a separate user device of the protected party not used for the communication, or any combination thereof.

13. The system of claim 1, wherein the at least one processor is further configured to:

in response to monitoring the communication or determining that the identifier of the second party does not match an entry in the database, automatically block and/or terminate at least one function in at least one application associated with the protected party, the at least one application executing on at least one of the following: a user device of the protected party used for the communication, a separate user device of the protected party not used for the communication, or any combination thereof.

14. The system of claim 1, wherein the at least one processor is further configured to: in response to monitoring and media of the second party being connected to the communication, deliver an announcement to at least the second party.

15. The system of claim 1, wherein the at least one processor is further configured to automatically block or terminate the communication in response to the protected party reciting or transmitting, via keypress, more than two numbers in sequence.

16. The system of claim 1, wherein the at least one processor is further configured to determine a security threshold is satisfied on the communication, wherein in response to determining that the security threshold is satisfied, automatically terminate the communication.

17. A method comprising:

detecting, with at least one processor, a first communication request for a first communication between a protected party and a second party, the first communication originated from the second party in conjunction with an originating service provider;

in response to determining the first communication originated from the second party:

determining if an identity of the second party is verified by the originating service provider based on at least one of STIR/SHAKEN attestation or a network operator;

in response to determining that the identity of the second party is verified by the originating service provider or a network operator, initiating a search in a database maintained by the protected party based on an identifier of the second party;

determining if the identifier of the second party matches an entry in the database based on the search; and only in response to determining that the identifier of the second party does not match an entry in the database, automatically monitoring audio of the first communication in real-time, wherein the audio of the first communication is not monitored if the identifier of the second party matches the entry in the database; and detecting, with the at least one processor, a second communication request for a second communication between the protected party and a different second party, the different second communication originated by the protected party; and in response to determining the second communication is originated by the protected party:

initiating a search in the database maintained by the protected party based on an identifier of the different second party;

determining if the identifier of the different second party matches an entry in the database based on the search; and only in response to determining that the identifier of the different second party does not match an entry in the database, automatically monitoring audio of the second communication in real-time, wherein the audio of the second communication is not monitored if the identifier of the different second party matches the entry in the database.

18. The method of claim 17, further comprising notifying a third party or an artificial intelligence system in response to determining a security threshold is satisfied on the monitored communication between the protected party and the second party.

19. The method of claim 18, wherein the at least one processor is further configured to provide an option to the third party to at least one of: join the communication, takeover the communication, or terminate the communication for the protected party.

20. The method of claim 17, further comprising automatically adding a security operator to the communication in response to determining a security threshold is satisfied on the monitored communication between the protected party and the second party.

21. The method of claim 17, wherein the at least one processor comprises at least one of the following: a processor of a user device operated by the protected party, a processor of a remote server computer, or any combination thereof.

22. The method of claim 17, wherein automatically monitoring the communication comprises:

automatically transcribing audio of the communication to a transcription in real-time; and analyzing the transcription for content comprising at least one of the following: a misrepresentation of identity, a directive or instruction, a question or prompt for personally identifiable information, a website, an application, a number, a code, a username, financial information, a social security number, a dual tone multifrequency digit, or any combination thereof.

23. The method of claim 22, further comprising determining a security threshold is satisfied on the communication between the protected party and the second party based on inputting the transcribed text into at least one of the following: an algorithm, an artificial intelligence system, a machine-learning model, a natural language processing model, a large language model, a foundation artificial intelligence model, a generative artificial intelligence model, or any combination thereof.

24. The method of claim 17, further comprising, wherein the database maintained by the protected party comprises a safe list separate from a contacts database.

25. The method of claim 17, further comprising retrieving and/or receiving registration information associated with a verified identity or lack thereof of the second party during the communication, wherein the at least one processor is further configured to automatically monitor the communication in response to determining the registration information is not associated with the verified identity and the identifier of the second party matches the entry in the database.

26. The method of claim 17, further comprising determining a security threshold is satisfied on the communication between the protected party and the second party, wherein in response to determining that the security threshold is satisfied, a warning is automatically presented to the protected party, and wherein presenting the warning comprises at least one of displaying a visual warning or emitting an audible warning on a user device operated by the protected party.

27. The method of claim 17, further comprising: in response to determining that a security threshold is satisfied on the communication between the protected party and the second party, prompting the protected party through a user device operated by the protected party to select at least one selectable option from a plurality of selectable options comprising at least two of the following: an option to confirm the communication, an option to cancel the communication, an option to retrieve information about the second party, an option to report the second party, an option to bridge in a third party to the communication, an option for the protected party to provide control of the call to a third party comprising a human or artificial intelligence, an option to notify a third party, or any combination thereof.

28. The method of claim 17, further comprising: in response to determining that a security threshold is satisfied on the communication, automatically blocking and/or terminating at least one function in at least one application associated with the protected party, the at least one application executing on at least one of the following: a user device of the protected party used for the communication, a separate user device of the protected party not used for the communication, or any combination thereof.

29. The method of claim 17, further comprising:

in response to monitoring the communication or determining that the identifier of the second party does not match an entry in the database, automatically blocking and/or terminating at least one function in at least one application associated with the protected party, the at least one application executing on at least one of the following: a user device of the protected party used for the communication, a separate user device of the protected party not used for the communication, or any combination thereof.

30. An apparatus comprising a non-transitory computer-readable medium including program instructions that, when executed by at least one processor, cause the at least one processor to:

detect a communication request for a communication between a protected party and a second party, the communication originated by the second party in conjunction with an originating service provider or originated by the protected party;

in response to determining the communication originated from the second party:

determine if an identity of the second party is verified by the originating service provider based on at least one of STIR/SHAKEN attestation or a network operator;

in response to determining that the identity of the second party is not verified by the originating service provider or a network operator, automatically monitor audio of the communication in real-time;

in response determining that the identity of the second party is verified by the originating service provider or a network operator, initiate a search in a database maintained by the protected party based on an identifier of the second party;

determine if the identifier of the second party matches an entry in the database based on the search;

in response to determining that the identifier of the second party matches an entry in the database, allowing the communication to progress without monitoring audio of the communication in real-time; and in response to determining that the identifier of the second party does not match an entry in the database, automatically monitor audio of the communication in real-time; and in response to determining the communication is originated by the protected party:

initiate a search in a database maintained by the protected party based on an identifier of the second party;

determine if the identifier of the second party matches an entry in the database based on the search;

in response to determining that the identifier of the second party does not match an entry in the database, automatically monitor audio of the communication in real-time; and in response to determining that the identifier of the second party matches an entry in the database, allowing the communication to progress without monitoring audio of the communication in real-time.

\* \* \* \* \* 20